(12) United States Patent
Hawks et al.

(10) Patent No.: US 10,875,792 B2
(45) Date of Patent: Dec. 29, 2020

(54) SYSTEM AND METHOD FOR HIGH EFFICIENCY ELECTROCHEMICAL DESALINATION

(71) Applicants: Steven Hawks, Livermore, CA (US); Michael Stadermann, Pleasanton, CA (US); Juan G. Santiago, Stanford, CA (US); Ashwin Ramachandran, Stanford, CA (US)

(72) Inventors: Steven Hawks, Livermore, CA (US); Michael Stadermann, Pleasanton, CA (US); Juan G. Santiago, Stanford, CA (US); Ashwin Ramachandran, Stanford, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/418,487

(22) Filed: May 21, 2019

(65) Prior Publication Data
US 2019/0359506 A1 Nov. 28, 2019

Related U.S. Application Data

(60) Provisional application No. 62/675,244, filed on May 23, 2018.

(51) Int. Cl.
*C02F 1/46* (2006.01)
*C02F 1/469* (2006.01)

(52) U.S. Cl.
CPC ........ *C02F 1/4691* (2013.01); *C02F 2201/46* (2013.01)

(58) Field of Classification Search
CPC ................ C02F 1/4691; C02F 2201/46; C02F 2209/003; C02F 2209/05
See application file for complete search history.

(56) References Cited

U.S. PATENT DOCUMENTS

2013/0068630 A1\* 3/2013 DePaoli .................. C25B 15/02
205/687

OTHER PUBLICATIONS

Anderson, M.A., Cudero, A.L., Palma, J., 2010. Capacitive deionization as an electrochemical means of saving energy and delivering clean water. Comparison to present desalination practices: Will it compete? Electrochim. Acta 55, 3845-3856. https://doi.org/10.1016/J.Electacta.2010.02.012.

(Continued)

*Primary Examiner* — Arun S Phasge
(74) *Attorney, Agent, or Firm* — Harness, Dickey & Pierce, P.L.C.

(57) ABSTRACT

The present disclosure relates to a capacitive deionization (CDI) system for desalinating salt water. The system may have a capacitor formed by spaced apart first and second electrodes, which enable a fluid flow containing salt water to pass either between them or through them. An input electrical power source is configured to generate an electrical forcing signal between the two electrodes. The electrical forcing signal represents a periodic signal including at least one of voltage or current, and which can be represented as a Fourier series. One component of the Fourier series is a constant, and a second component of the Fourier series is a sinusoidal wave of non-zero frequency which has the highest amplitude of the additive components of the Fourier series. The amplitude of the sinusoidal wave component is between 0.85 and 1.25 times the amplitude of the periodic signal.

18 Claims, 15 Drawing Sheets

(56) References Cited

OTHER PUBLICATIONS

Biesheuvel, P.M., van der Wal, A., 2010. Membrane capacitive deionization. J. Memb. Sci. 346, 256-262. https://doi.org/10.1016/J.MEMSCI.2009.09.043.

Biesheuvel, P.M., Van Limpt, B., VanDerWal, A., 2009. Dynamic adsorption/desorption process model for capacitive deionization. J. Phys. Chem. C 113, 2009, 5636-5640. https://doi.org/10.1021/jp809644s.

Choi, J.-H., 2015. Comparison of constant voltage (CV) and constant current (CC) operation in the membrane capacitive deionisation process. Desalin. Water Treat. 56, 921-928. https://doi.org/10.1080/19443994.2014.942379.

de Levie, R., 1963. On porous electrodes in electrolyte solutions. Electrochim. Acta 8, 751-780. https://doi.org/10.1016/0013-4686(63)80042-0.

Garcia-Quismondo, E., Gomez, R., Vaquero, F., Cudero, A.L., Palma, J., Anderson, M., 2013. New testing procedures of a capacitive deionization reactor. Phys. Chem. Chem. Phys. 15, 7648. https://doi.org/10.1039/c3cp50514f.

Garcia-Quismondo, E., Gomez, R., Vaquero, F., Cudero, A.L., Palma, J., Anderson, M., Phys. Chem. Chem. Phys., 2013., 15, 7648.

Garcia-Quismondo, E., Santos, C., Soria, J., Palma, J., Anderson, M.A., 2016. New Operational Modes to Increase Energy Efficiency in Capacitive Deionization Systems. Environ. Sci. Technol. 50, 6053-6060. https://doi.org/10.1021/acs.est.5b05379.

Guyes, E.N., Shocron, A.N., Simanovski, A., Biesheuvel, P.M., Suss, M.E., 2017. A one-dimensional model for water desalination by flow-through electrode capacitive deionization. Desalination 415, 8-13. https://doi.org/10.1016/J.DESAL.2017.03.013.

Hawks, S.A., Knipe, J.M., Campbell, P.G., Loeb, C.K., Hubert, M.A., Santiago, J.G., Stadermann, M., 2018a. Quantifying the flow efficiency in constant-current capacitive deionization. Water Res. 129, 327-336. https://doi.org/10.1016/j.watres.2017.11.025.

Hawks, S.A., Ramachandran, A., Campbell, P.G., Suss, M.E., Biesheuvel, P.M., Santiago, J.G., 2019. Performance Metrics for the Objective Assessment of Capacitive Deionization Systems, Water Res. 152, 126-137.

Hemmatifar, A., Palko, J.W., Stadermann, M., Santiago, J.G., 2016. Energy breakdown in capacitive deionization. Water Res. 104, 303-311. https://doi.org/10.1016/J.WATRES.2016.08.020.

Hemmatifar, A., Stadermann, M., Santiago, J.G., 2015. Two-Dimensional Porous Electrode Model for Capacitive Deionization. J. Phys. Chem. C 119, 24681-24694. https://doi.org/10.1021/acs.jpcc.5b05847.

Jande, Y.A.C., Kim, W.S., 2013. Desalination using capacitive deionization at constant current. Desalination 329,29-34. https://doi.org/10.1016/J.DESAL.2013.08.023.

Johnson, A.M., Newman, J., 1971. Desalting by Means of Porous Carbon Electrodes. J. Electrochem. Soc. 118, 510. https://doi.org/10.1149/1.2408094.

Kang, J., Kim, T., Jo, K., Yoon, J., 2014. Comparison of salt adsorption capacity and energy consumption between constant current and constant voltage operation in capacitive deionization. Desalination 352, 52-57. https://doi.org/10.1016/j.desal.2014.08.009.

Kim, T., Dykstra, J.E., Porada, S., van der Wal, A., Yoon, J., Biesheuvel, P.M., 2015. Enhanced charge efficiency and reduced energy use in capacitive deionization by increasing the discharge voltage. J. Colloid Interface Sci. 446, 317-326. https://doi.org/10.1016/J.JCIS.2014.08.041.

Mutha, H.K., Cho, H.J., Hashempour, M., Wardle, B.L., Thompson, C. V., Wang, E.N., 2018. Salt rejection in flow-between capacitive deionization devices. Desalination 437, 154-163. https://doi.org/10.1016/J.DESAL.2018.03.008.

Oren, Y., 2008. Capacitive deionization (CDI) for desalination and water treatment—past, present and future (a review). Desalination 228, 10-29. https://doi.org/10.1016/J.DESAL.2007.08.005.

Qu, Y., Campbell, P.G., Gu, L., Knipe, J.M., Dzenitis, E., Santiago, J.G., Stadermann, M., 2016. Energy consumption analysis of constant voltage and constant current operations in capacitive deionization. Desalination 400, 18-24. https://doi.org/10.1016/j.desal.2016.09.014.

Qu, Y., Campbell, P.G., Hemmatifar, A., Knipe, J.M., Loeb, C.K., Reidy, J.J., Hubert, M.A., Stadermann, M., Santiago, J.G., 2018. Charging and Transport Dynamics of a Flow-Through Electrode Capacitive Deionization System. J. Phys. Chem. B acs.jpcb.7b09168. https://doi.org/10.1021/acs.jpcb.7b09168.

Ramachandran, A., Hemmatifar, A., Hawks, S.A., Stadermann, M., Santiago, J.G., 2018a. Self similarities in desalination dynamics and performance using capacitive deionization. Water Res. 140, 323-334. https://doi.org/10.1016/j.watres.2018.04.042.

Saleem, M.W., Jande, Y.A.C., Asif, M., Kim, W.S., 2016. Hybrid CV-CC operation of capacitive deionization in comparison with constant current and constant voltage. Sep. Sci. Technol. 51, 1063-1069. https://doi.org/10.1080/01496395.2015.1127258.

Suss, M.E., Porada, S., Sun, X., Biesheuvel, P.M., Yoon, J., Presser, V., 2015. Water desalination via capacitive deionization: what is it and what can we expect from it? Energy Environ. Sci. 8, 2296-2319. https://doi.org/10.1039/C5EE00519A.

Wang, L., Lin, S., 2018a. Intrinsic tradeoff between kinetic and energetic efficiencies in membrane capacitive deionization. Water Res. 129, 39 01. https://doi.org/10.1016/J.WATRES.2017.11.027.

Wang, L., Lin, S., 2018b. Membrane Capacitive Deionization with Constant Current vs Constant Voltage Charging: Which Is Better? Environ. Sci. Technol. 52,4051-4060. https://doi.org/10.1021/acs.est.7b06064.

Welgemoed, T.J., Schutte, C.F., 2005. Capacitive Deionization Technology™: An alternative desalination solution. Desalination 183, 327-340. https://doi.org/10.1016/J.DESAL.2005.02.054.

* cited by examiner

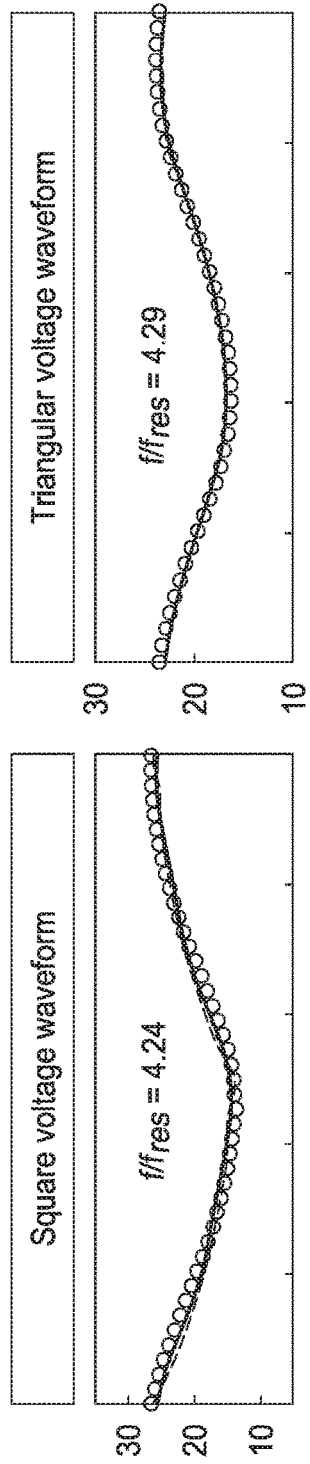
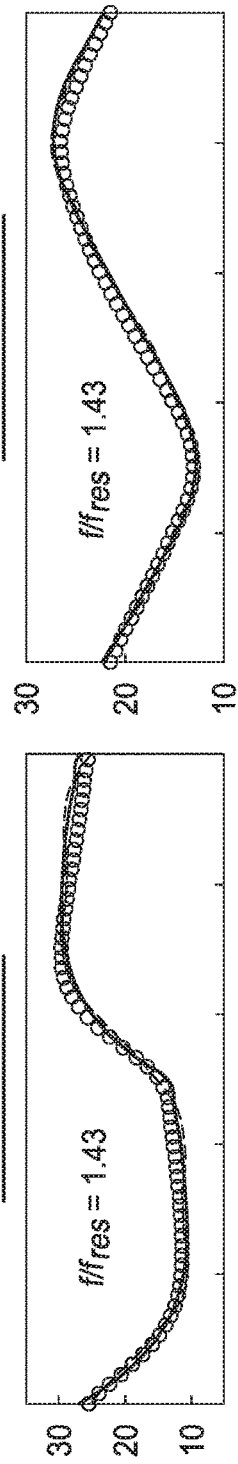
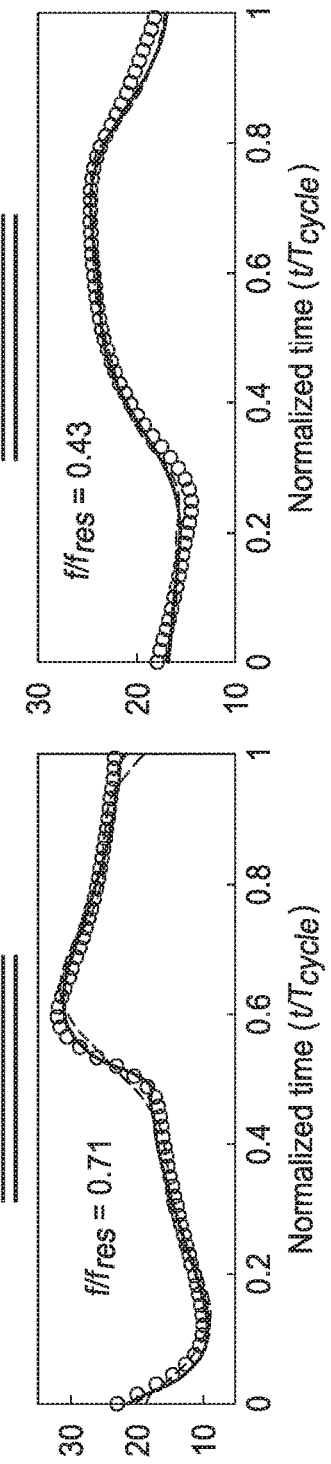
FIGURE 6A   FIGURE 6B   FIGURE 6C   FIGURE 6D   FIGURE 6E   FIGURE 6F
○ Experimental data  ---- Linear superposition of response due to the first 2 Fourier modes
—— Linear superposition of response due to the first 10 Fourier modes

SYSTEM AND METHOD FOR HIGH EFFICIENCY ELECTROCHEMICAL DESALINATION

CROSS-REFERENCE TO RELATED APPLICATIONS

This application claims the benefit of U.S. Provisional Application No. 62/675,244, filed on May 23, 2018. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for desalination, and more particularly to systems and methods for cyclic adsorption/desorption based on electrochemical desalination.

BACKGROUND

This section provides background information related to the present disclosure which is not necessarily prior art.

With growing water shortages globally, roughly one quarter of all water desalination demand is for inland brackish water desalination technology. Conventional methods like reverse osmosis or thermal methods are highly energy inefficient for low salinity (e.g., brackish) water desalination. Capacitive deionization ("CDI") is an emerging, highly energy efficient brackish water desalination technology.

Like many other multi-physics problems, CDI involves coupling of multiple time scales and phenomena. CDI salt removal dynamics are determined by the interplay between electrical charging/discharging, which depends on cell ionic and electrical resistances and capacitance, coupled with bulk mass transport. Moreover, CDI is inherently periodic because electrical charging and discharging forcing functions result in periodic salt removal and regeneration phases.

CDI performance can be evaluated using a recently proposed set of metrics (e.g., see Hawks et al. *"Performance Metrics for the Objective Assessment of Capacitive Deionization Systems." arXiv preprint arXiv.* 1805.03247 (2018)). These performance metrics include average concentration reduction, volumetric energy consumption, and productivity for 50% water recovery. Owing to the multi-physics nature of CDI, the desalination performance can be affected dramatically by the particular choice of operating method. Most of the previous research on CDI operation has centered around the use of constant current ("CC") and/or constant voltage ("CV"), and very little attention has been given to other possible operational schemes. CC operation has been shown to consume less energy compared to CV, given equal amount of salt removal (Choi. *"Comparison of Constant Voltage (CV) and Constant Current (CC) Operation in the Membrane Capacitive Deionisation Process,"* Desalination Water Treatment 56.4 (2015), 921-928. https://doi.org/10.1080/19443994.2014.942379; Kang et al. *"Comparison of Salt Adsorption Capacity and Energy Consumption Between Constant Current and Constant Voltage Operation in Capacitive Deionization,"* Desalination 352 (2014), 52-57. https://doi.org/10.1016/j.desal.2014.08.009; Qu et al., *"Energy Consumption Analysis of Constant Voltage and Constant Current Operations in Capacitive Deionization,"* Desalination 400, (2016): 18-24. https://doi.org/10/1016/j.desal.2016.09.014). CC can also achieve a controllable quasi-steady state effluent concentration. Conversely, CV can achieve faster rates of desalination, albeit with a tradeoff in energy consumption. Recent research around operational schemes for CDI have proposed mixed CC-CV modes, variable flow rate, changing feed concentration, and variable forcing function periods. Generally, such research/studies can be characterized as ad-hoc operational strategies geared toward the improvement of one (or few) metrics at the cost of others.

The co-inventors of the present disclosure know of no work which combines a theoretical framework and accompanying validation experiments which explore generalized control waveform shapes for CDI. In other words, to the understanding of the co-inventors, previous studies to date have only explored ad hoc operational schemes such as square waves in applied current or voltage. A key step in developing favorable operation modes for CDI involves understanding the role of arbitrary periodic forcing functions (including frequency and wave shape) on the aforementioned desalination performance metrics.

In summary, previously developed desalination systems have been limited in terms of being able to achieve optimum operational efficiency. More specifically, such previously developed desalination systems have not been able to address the complexity of cyclic CDI operation, which can have arbitrarily variable flow rate and charging modes, in a manner that optimizes overall efficiency of the CDI process.

SUMMARY

This section provides a general summary of the disclosure, and is not a comprehensive disclosure of its full scope or all of its features.

In one aspect the present disclosure relates to a capacitive deionization (CDI) system for desalinating salt water. The system may comprise a capacitor formed by a first electrode and a second electrode spaced apart from the first electrode, which enables a fluid flow containing salt water to pass at least one of between the first and second electrodes, or through the first and second electrodes. The system may also include an input electrical power source configured to generate an electrical forcing signal between the first and second electrodes, with the electrical forcing signal representing a periodic signal including at least one of voltage or current. The periodic signal can be represented as a Fourier series, and one component of the Fourier series is a constant. A second component of the Fourier series is a sinusoidal wave of non-zero frequency which has the highest amplitude of the additive components of the Fourier series. The amplitude of the sinusoidal wave component is between 0.85 and 1.25 times the amplitude of the periodic signal.

In another aspect the present disclosure relates to a capacitive deionization (CDI) system for desalinating salt water. The system may comprise a capacitor formed by a first electrode and a second electrode spaced apart from the first electrode, which enables a fluid flow containing salt water to pass at least one of between the first and second electrodes, or through the first and second electrodes. The system may further include an input electrical power source which is configured to generate an input electrical forcing signal between the first and second electrodes, wherein the input electrical forcing signal represents a periodic signal including at least one of voltage or current. The periodic signal may have a fundamental frequency within a factor of 10 of a resonant frequency $\omega_{res}$ given, where $\omega_{res}$ is given by:

$$\omega_{res} = \frac{1}{\sqrt{\tau RC}}$$

wherein $\tau$ is a flow time scale given by $$\tau = V/Q$$

wherein V is a fluid volume contained with the CDI cell and Q is a time-averaged volume flow rate through the CDI cell, and wherein RC is the product of the characteristic resistance R and capacitance C of the electrical response of the CDI cell.

In another aspect the present disclosure relates to a capacitive deionization (CDI) system for desalinating salt water. The system may comprise a capacitor formed by a first electrode and a second electrode spaced apart from the first electrode, which enables a fluid flow containing salt water to pass at least one of between the first and second electrodes, or through the first and second electrodes. An input electrical power source may be provided. The input electrical power source may be configured to generate an electrical forcing signal between the first and second electrodes. The electrical forcing signal may represent a periodic signal including at least one of voltage or current, wherein the periodic signal has a fundamental frequency within a factor of 10 of a resonant frequency $\omega_{res}$ given, where $\omega_{res}$ is given by:

$$\omega_{res} = \frac{1}{\sqrt{\tau RC}}$$

wherein $\tau$ is a flow time scale given by $$\tau = V/Q$$

and wherein V is a fluid volume contained with the CDI cell and Q is a time-averaged volume flow rate through the CDI cell, and wherein RC is the product of the characteristic resistance R and capacitance C of the electrical response of the CDI cell, and wherein the periodic signal has a Fourier series as additive sinusoidal components, and wherein the amplitude of the sinusoidal wave of non-zero frequency with the highest amplitude of the additive components of the Fourier series is between 0.85 and 1.25 times the amplitude of the forcing periodic signal.

In still another aspect the present disclosure relates to a method for desalinating salt water. The method may comprise using a capacitor formed by a first electrode and a second electrode spaced apart from the first electrode, which enables a fluid flow containing salt water to pass at least one of between the first and second electrodes, or through the first and second electrodes. The method may further comprise using an input electrical power source to apply an electrical forcing signal between the electrodes, and controlling the electrical forcing signal to provide at least one of voltage or current as a periodic wave with a fundamental frequency plus a constant component. The method further may include controlling the electrical forcing signal so that a Fourier series representation of the periodic wave includes a non-zero frequency sinusoidal mode which has the highest amplitude of the additive components of the Fourier series with an amplitude between 0.85 and 1.25 times the amplitude of the forcing periodic signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings:

FIG. 1 shows a high level schematic of a CDI system along with of the coupling between the electrical and fluid flow physics in CDI, wherein the "Input" graph on the left shows how the linear RC circuit governs ion electrosorption via charge transfer, while the well-mixed reactor volume, illustrated on the "Output" graph on the right, affects the efficiency of recovery of processed water recovery at the effluent via bulk advection;

FIG. 2 shows graphs of effluent concentration versus time (normalized by cycle period) of a CDI cell in accordance with the present disclosure, for a sinusoidal voltage input between 0.7-1.1 V ($V_{dc}$=0.9 V and $\Delta V$=0.2 V), with frequencies of 0.9, 2.5 and 8.8 mHz, a constant flowrate of 2.3 ml/min, and a feed concentration of 20 mM, and where the triangles, circles and squares correspond to experimental data results, while the solid lines of each curve represent model results, and where the inset graph shows the sinusoidal voltage forcing function;

FIGS. 3a and 3b show measured current and effluent concentration profiles versus time (normalized by cycle duration) for a sinusoidal voltage forcing with frequencies spanning 0.2 to 17.7 mHz, and wherein FIG. 3a shows an inset figure with the results for two voltage windows with the same $\Delta V$ of 0.2 V, but with $V_{dc}$ values of 0.8 V (dashed lines) and 0.9 V (solid lines);

FIGS. 3c and 3e respectively are graphs to illustrate the frequency dependence of the amplitude and phase of the current response (i.e. Bode plots for current);

FIGS. 3d and 3f are graphs the corresponding frequency dependence of average concentration reduction and phase shift in effluent concentration (Bode plots for $\Delta c$);

FIG. 4a shows graphs of the experimental volumetric energy consumption $E_v$ for a sinusoidal voltage operation versus frequency of operation for voltage windows of 0.6 to 1.0 V ($V_{dc}$=0.8 V and $\Delta V$=0.2 V) and 0.7 to 1.1 V ($V_{dc}$=0.9 V and $\Delta V$=0.2 V), and with the inset figure showing the variation of energy normalized adsorbed salt (ENAS) versus input voltage frequency normalized by $f_{res}$;

Figure 5A:
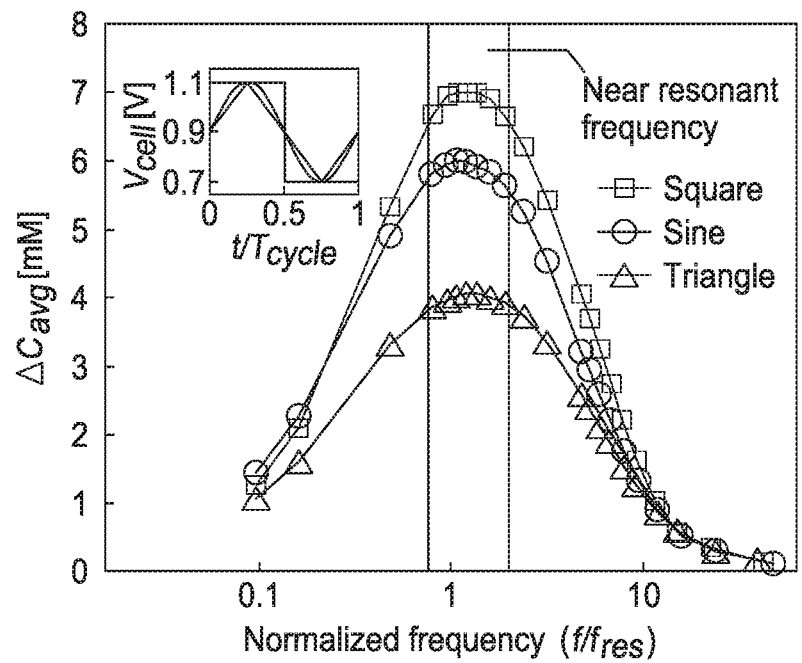
FIG. 5a shows graphs of measured values of (a) average effluent concentration reduction as a function of applied voltage frequency normalized by $f_{res}$, wherein data are shown for three different waveforms: square wave, triangular, and sinusoidal voltages, and wherein wave forms with 0.7 to 1.1 V voltage window are shown in the inset graph.
Figure 5B:
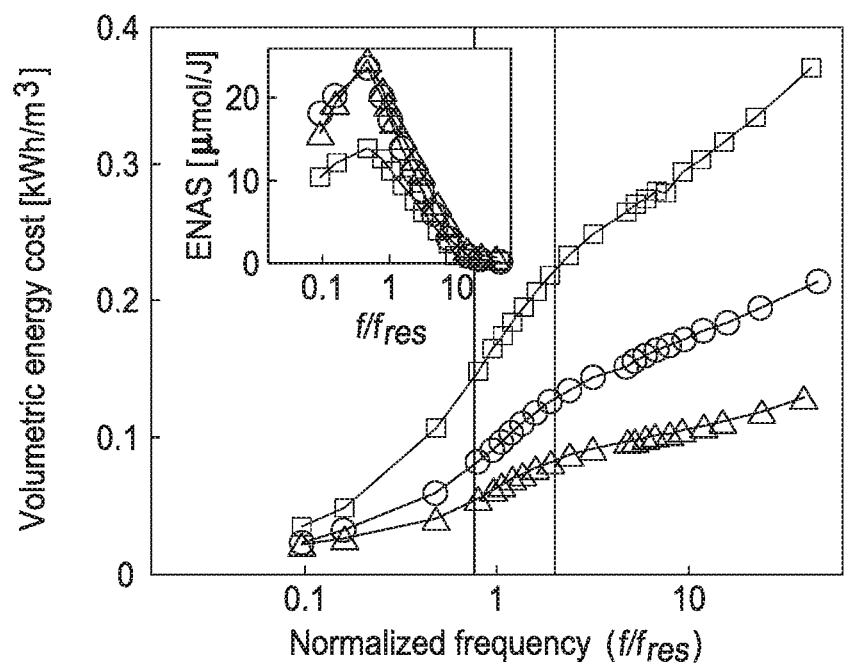
Figure 7A:
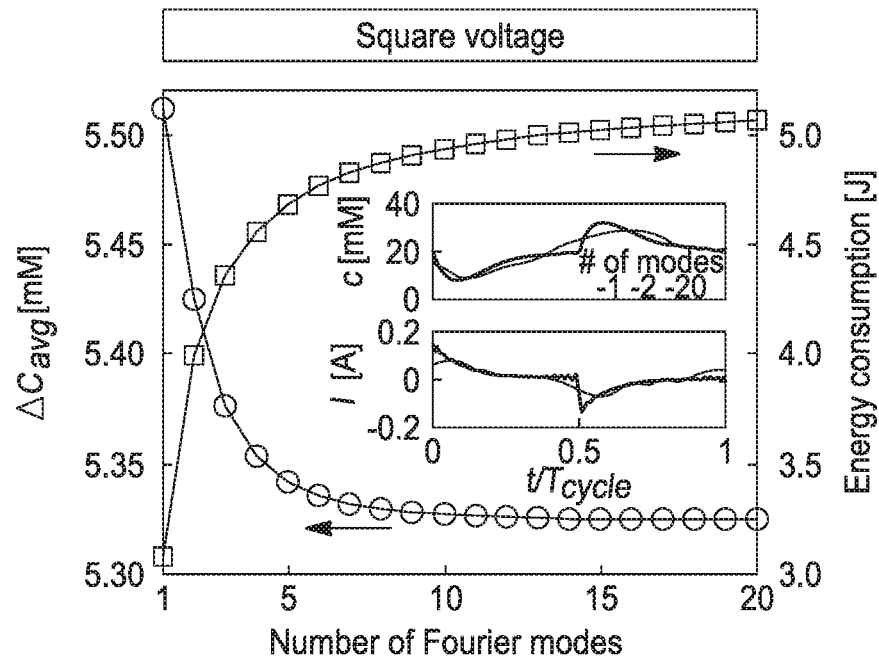
Figure 7B:
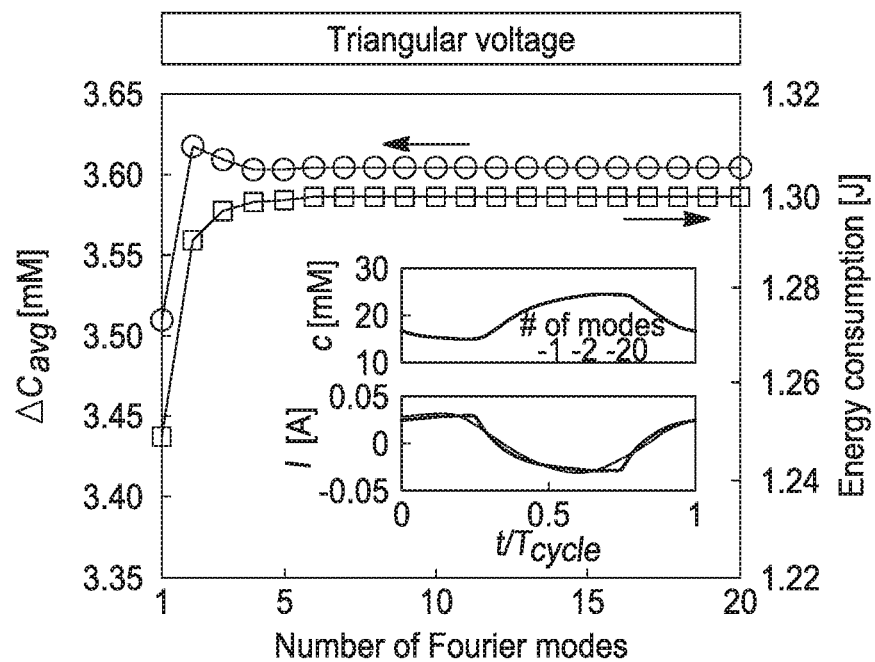
Figure 8:
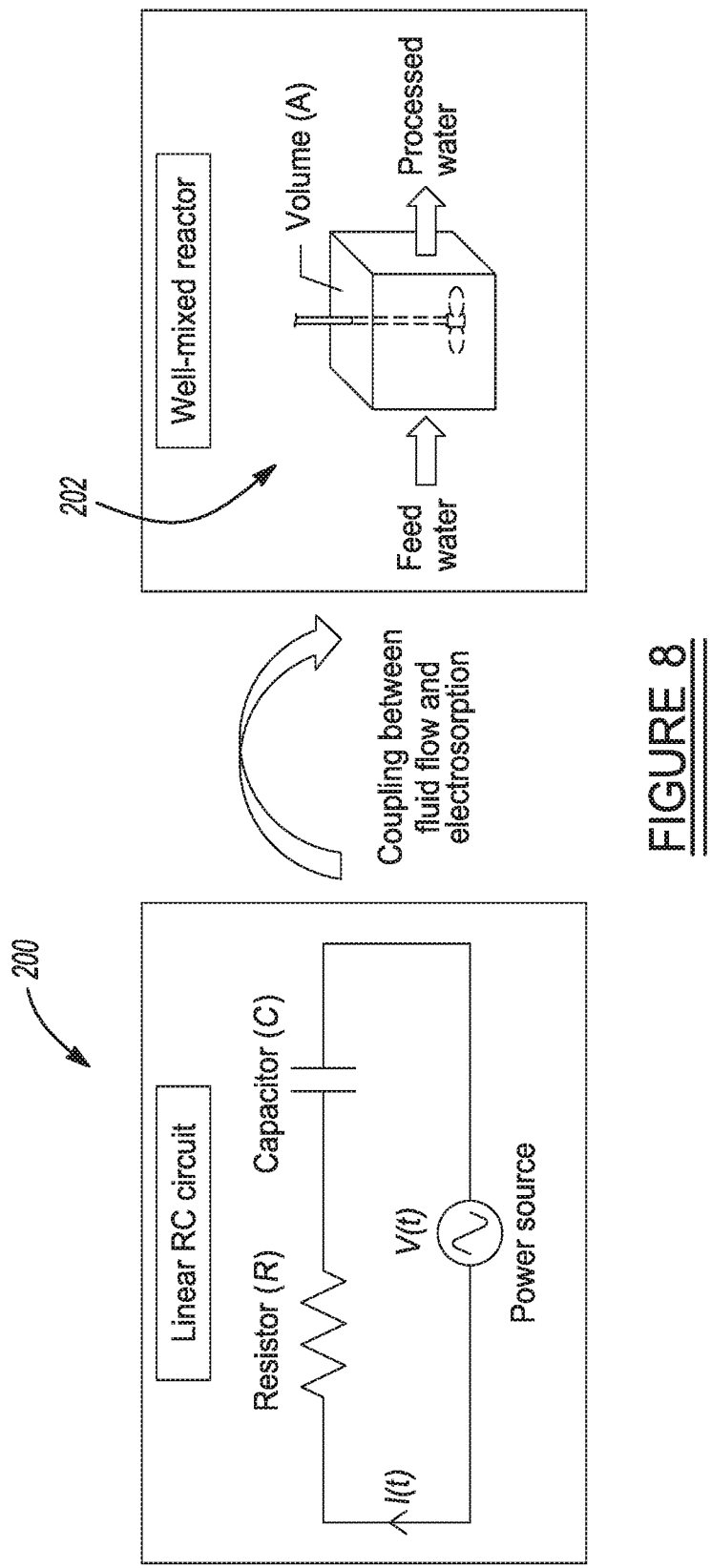
Figure 9A:
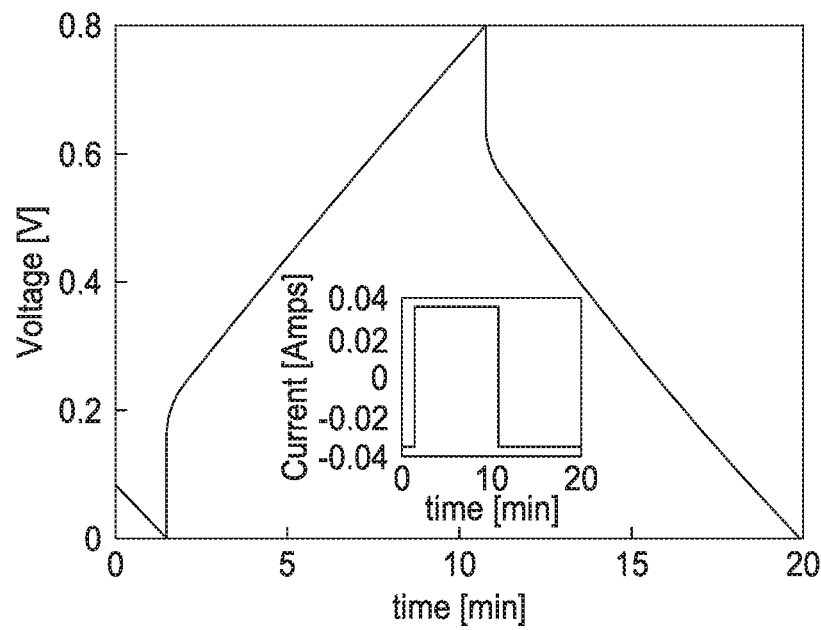
Figure 9B:
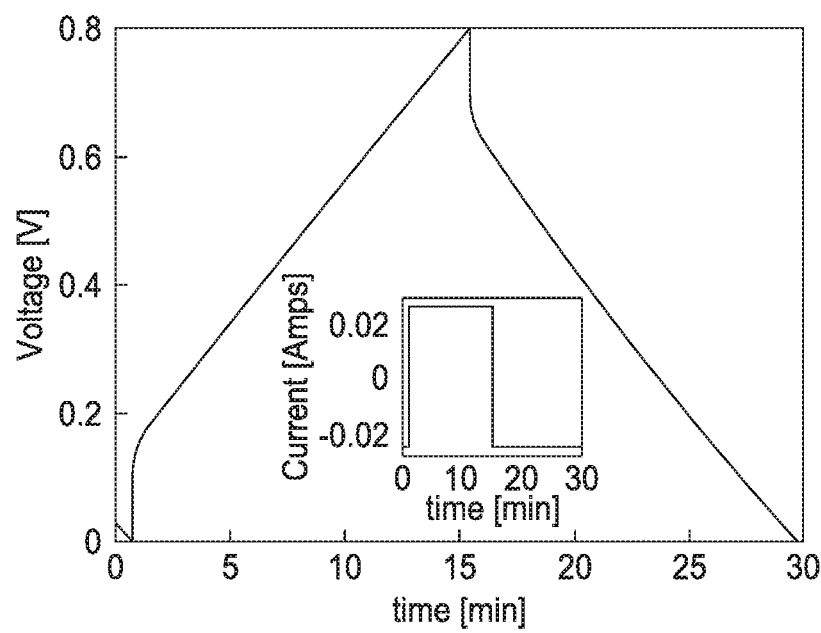
Figure 10A:
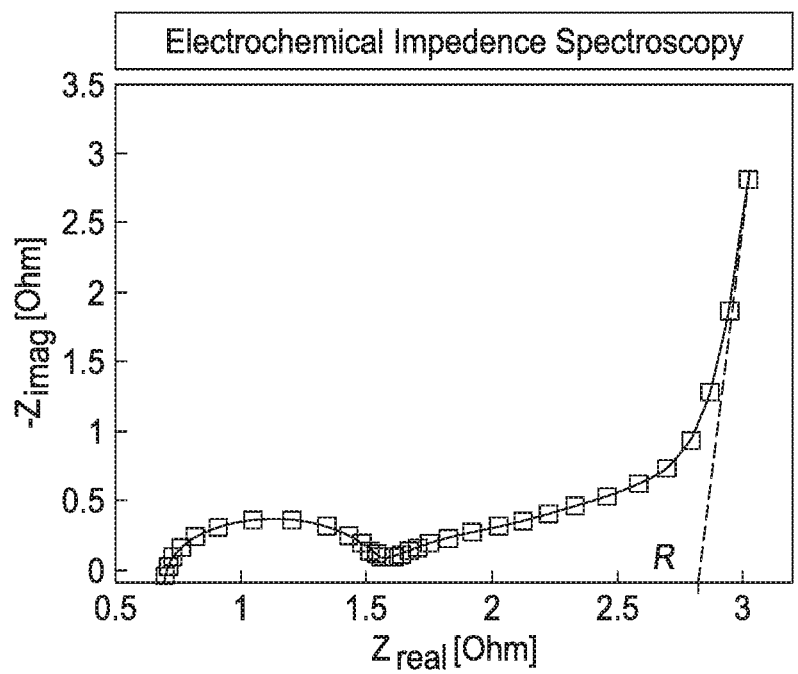
Figure 10B:
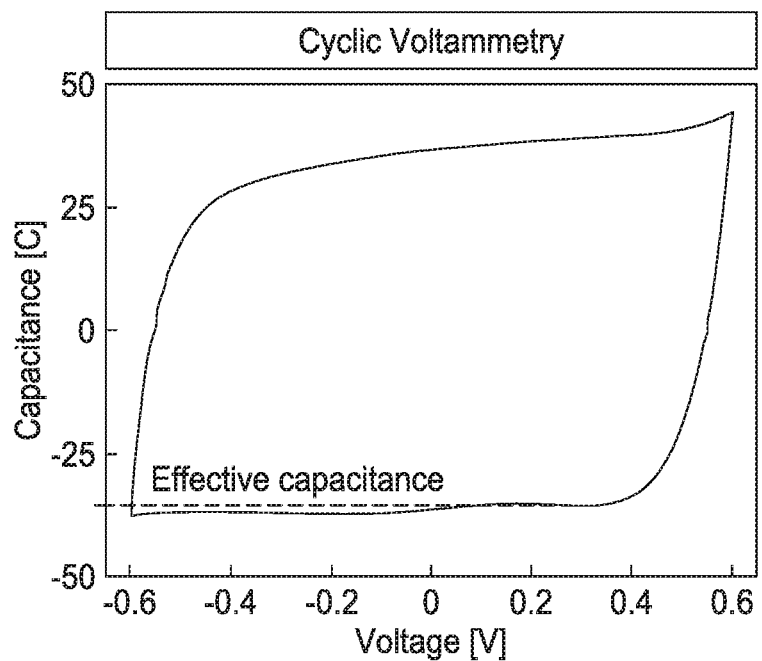
Figure 11B:
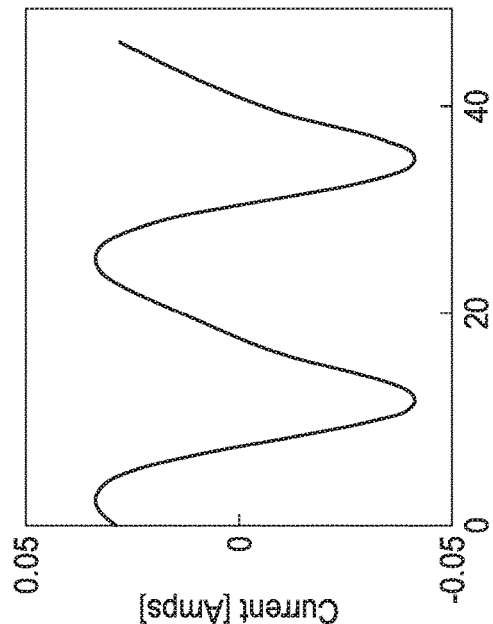
Figure 11D:
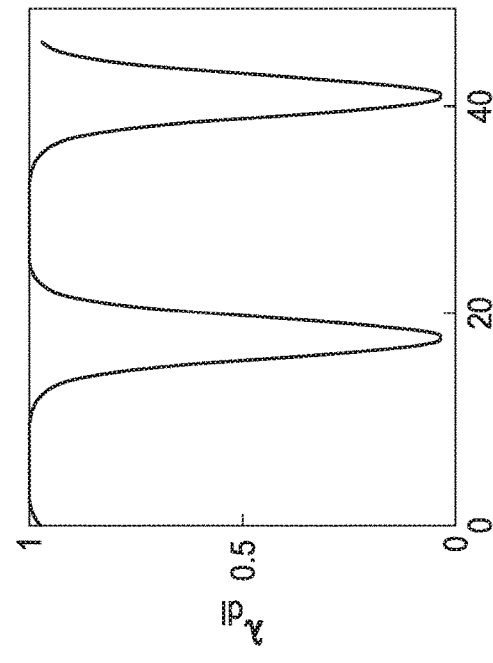
Figure 11A:
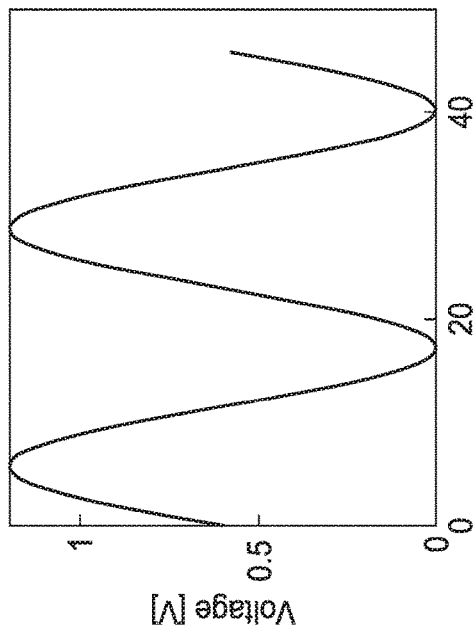
Figure 11C:
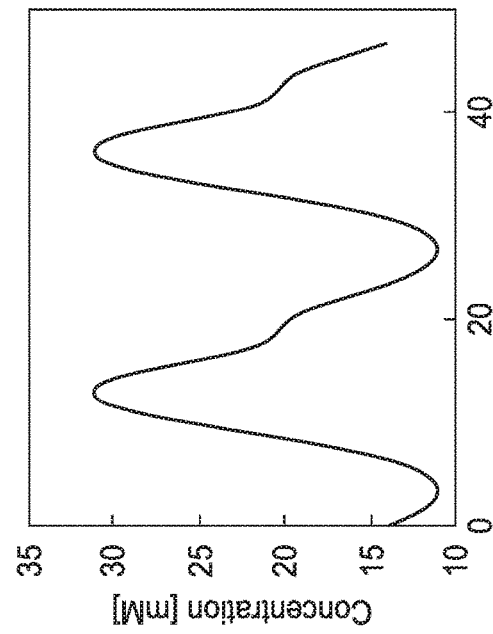

FIG. 5b shows graphs of volumetric energy consumption ($E_v$) as a function of applied voltage frequency normalized by $f_{res}$, wherein data are shown for three different waveforms: square wave, triangular, and sinusoidal voltages, and wherein wave forms with 0.7 to 1.1 V, and wherein the inset figure shows the variation of energy normalized adsorbed salt (ENAS) versus frequency for the three operations;

FIG. 6 shows graphs relating to measured effluent concentration versus time normalized by cycle duration for square voltage forcing at various frequencies (FIGS. 6a-6c), and triangular voltage forcing (FIGS. 6d-6f) at varying frequencies; and wherein data are shown with symbols and the linear superposition of response of the first two and ten Fourier modes based on theory are shown with solid lines;

FIGS. 7a and 7b shows graphs to illustrate concentration reduction and energy consumption versus the number of Fourier modes used to construct the responses for a square voltage forcing waveform (FIG. 7a) and for a triangular voltage forcing waveform (FIG. 7b), and wherein the results are shown for operation at frequency $f=0.5\ f_{res}$, and for values of resistance, capacitance, and flowrate mentioned in Section 3.2 herein, and wherein the insets of both plots show effluent concentration and current responses for the first one, two, and twenty Fourier modes;

FIG. 8 is a schematic of a model coupling electrical and fluid flow physics in CDI, wherein the linear RC circuit (left) governs ion electrosorption via charge transfer while a well-mixed reactor volume (right) affects the efficiency of recovery of processed water recovery at the effluent via bulk advection;

FIGS. 9a and 9b show graphs illustrating measured galvanostatic charging and discharging (voltage versus time) data for current values of 35 mA (FIG. 9a), and 25 mA (FIG. 9b); and wherein insets in each Figure show the corresponding current versus time data, and wherein data are shown for dynamic steady state operation (fifth charge-discharge cycle) and for a constant flow rate of 2.3 ml/min;

FIG. 10a shows a graph of a Nyquist plot of impedance from electrochemical impedance spectroscopy (EIS) of the cell under consideration, wherein a sinusoidal voltage perturbation was applied with amplitude of 10 mV and scanned over a frequency range from 1 MHz to 10 mHz with 0 V DC bias, and wherein the estimate of the effective resistance $R_\infty$, which includes the electrode, spacer, contact, and setup resistances, in indicated;

FIG. 10b is a graph showing a cyclic voltammogram of the cell under consideration performed at a scan rate of 0.2 mV/s, flow rate of 2.3 ml/min and with 20 mM KCl solution, and wherein data shown is for the fifth cycle (under steady state conditions), and further showing an estimated effective capacitance of $C_{eq} \approx 33$ F, and resistance of $R_\infty \approx 2.8$ Ohm;

FIGS. 11a-11d show graphs to illustrate characteristics of an example of an off-design sinusoidal voltage operation, wherein FIG. 11a shows voltage, FIG. 11b shows current, FIG. 11c shows effluent concentration, and FIG. 11d shows EDL charge efficiency, and wherein the graphs of each of FIGS. 11a-11d are plotted versus time under dynamic steady state operation (for two consecutive cycles), using a numerical GCS model, and wherein for the GCS model results shown here, we used $c_{st}$=0.4 F/m², a=100 m², g=1 µm/s, R=1 Ohm, $c_0$=20 mM, A=100 cm², $\forall$=2.1 ml, $V_{PZC}$=0 V, and Q=2.3 ml/min, with no leakage currents, and wherein the operation considered here is a sinusoidal voltage forcing with $V_{dc}$=0.6 V and $\Delta V$=0.6 V.

Figure 12:
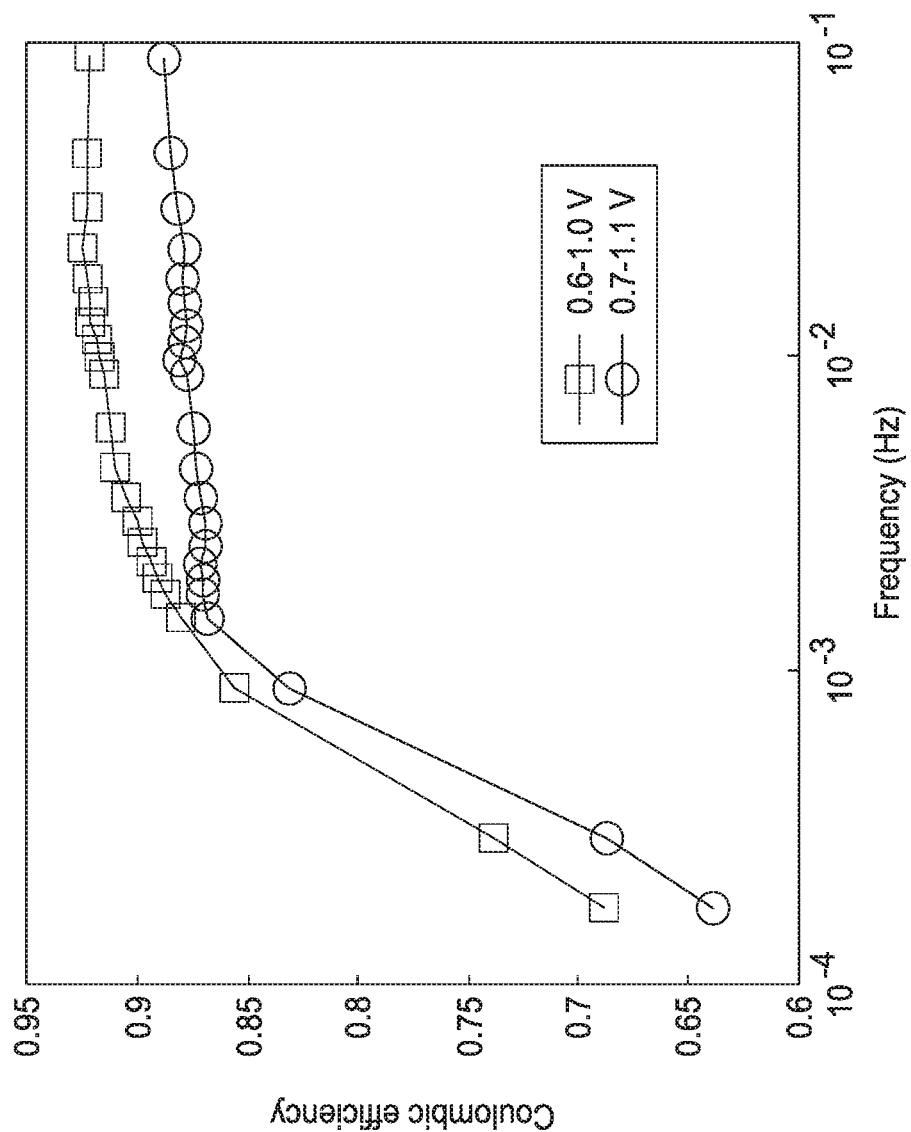
Figure 13A:
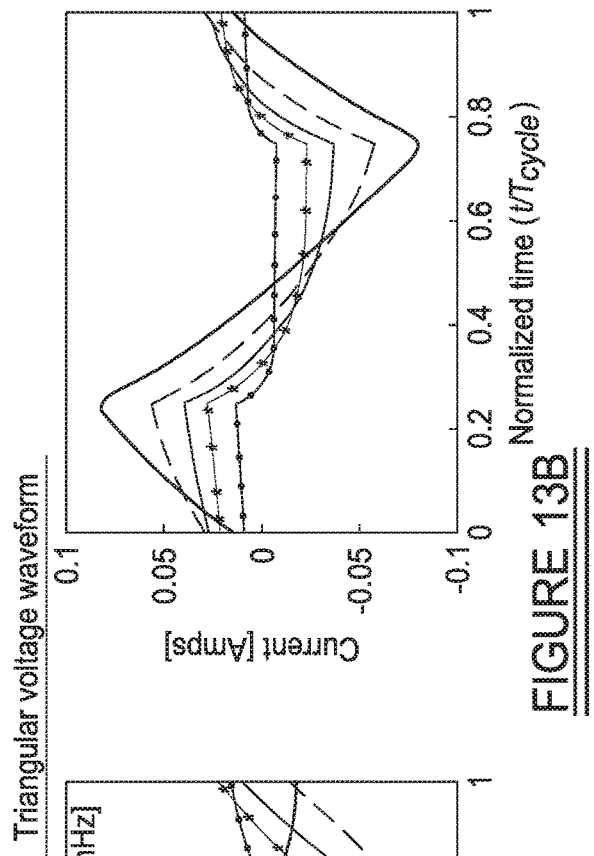
Figure 13B:
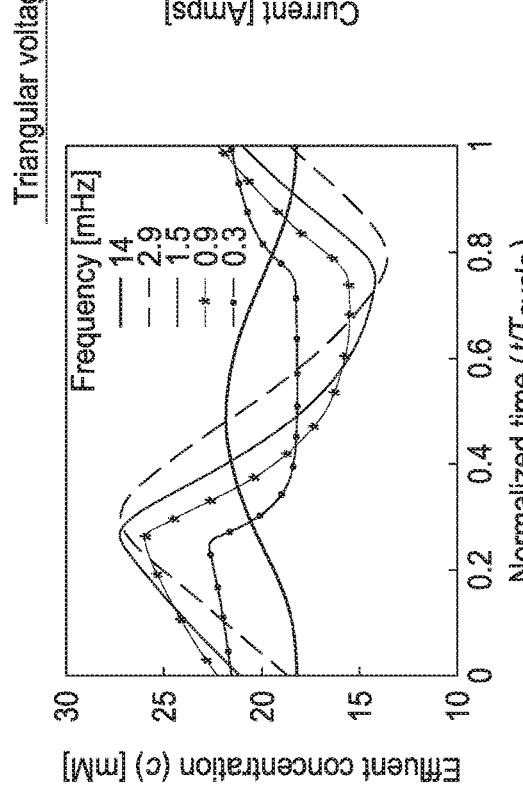
Figure 13C:
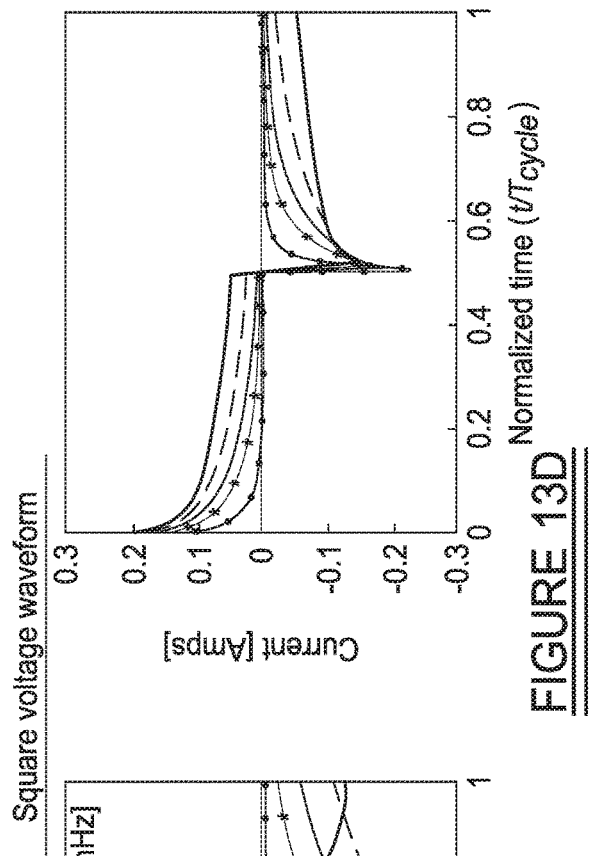
Figure 13D:
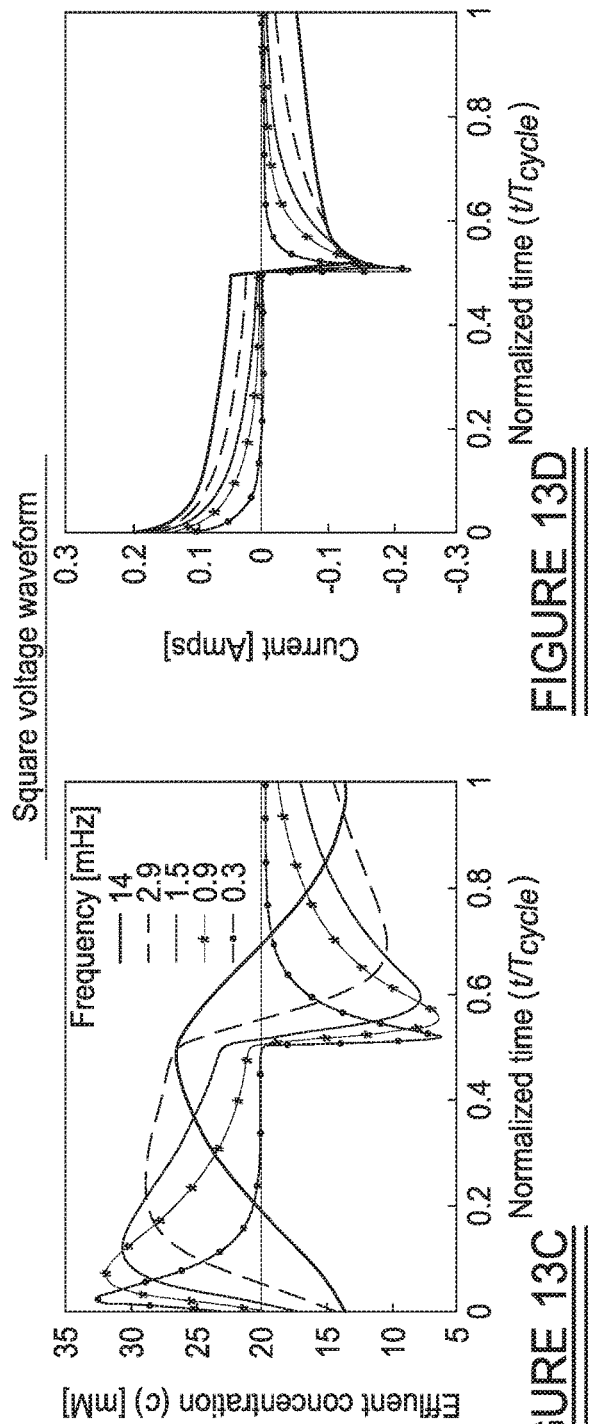
Figure 14:
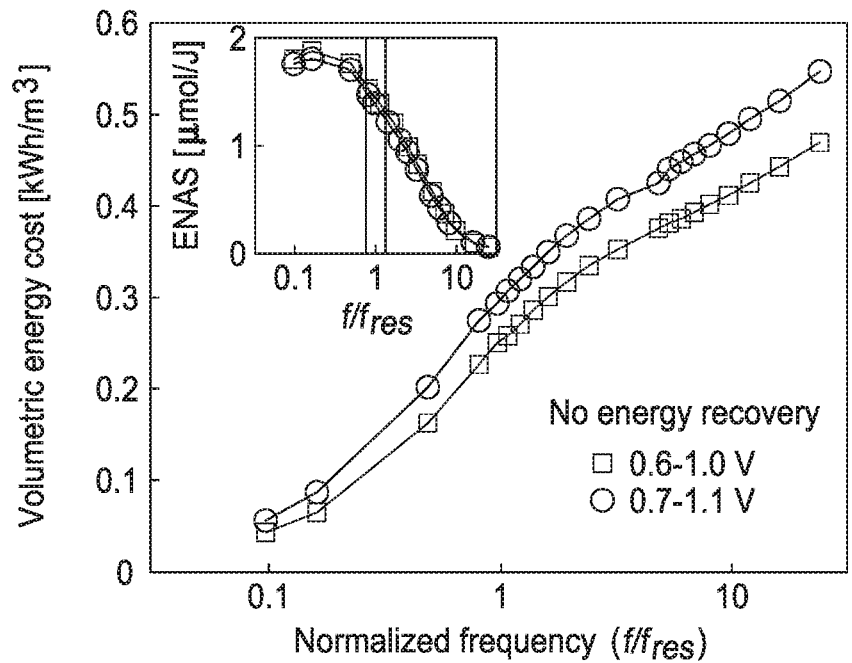
Figure 15:
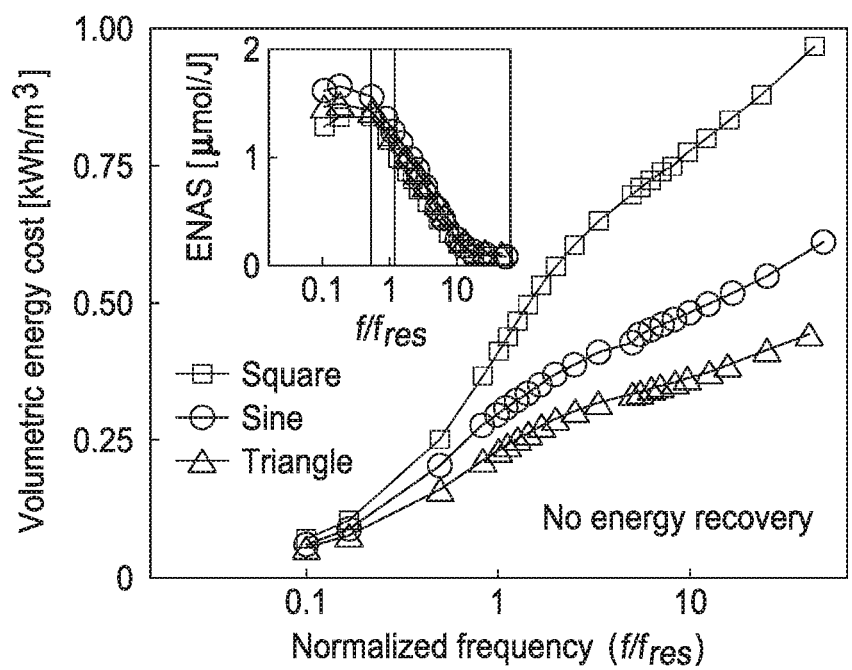

FIG. 12 shows graphs of calculated values of Coulombic efficiency $\lambda_c$ as a function of input sinusoidal voltage frequency for voltage windows of 0.6 to 1.0 V and 0.7 to 1.1 V, and constant flowrate of 2.3 ml/min, and wherein Coulombic efficiency is nearly constant for moderate to high frequencies, and decreases significantly for low frequencies (long cycle duration), and further indicating estimated Coulombic efficiency values (for practical operating frequencies that are not very low) of 0.88 and 0.92 for the 0.7-1.1V and 0.6-1.0 V cases, respectively;

FIGS. 13a and 13b show graphs to illustrate measured values of effluent concentration (FIG. 13a) and current (FIG. 13b) for triangular waveform forcing voltage CDI operation between 0.7 to 1.1 V, and wherein the flow rate was a constant value of 2.3 ml/min;

FIGS. 13c and 13d show graphs to illustrate measured values of effluent concentration (FIG. 13c) and current (FIG. 13d) for square wave waveform forcing voltage CDI operation between 0.7 to 1.1 V, and wherein the flow rate was a constant value of 2.3 ml/min;

FIG. 14 shows graphs of measured volumetric energy consumption with no energy recovery during discharge as a function of input sinusoidal voltage frequency for voltage windows of 0.6 to 1.0 V and 0.7 to 1.1 V, and wherein the inset graph shows the corresponding variation of energy normalized adsorbed salt (ENAS) versus input voltage frequency normalized by $f_{res}$; and FIG. 15 shows graphs of measured values of volumetric energy consumption with no energy recovery during discharge as a function of applied voltage frequency normalized by $f_{res}$, and wherein experimental data are shown for each one of a square voltage waveform, a triangular voltage waveform, and a sinusoidal voltage waveform, each being operated between 0.7 to 1.1 V, and wherein the inset shows the corresponding variation of measured energy normalized adsorbed salt (ENAS) versus frequency for the three operations.

Corresponding reference numerals indicate corresponding parts throughout the several views of the drawings.

DETAILED DESCRIPTION

Example embodiments will now be described more fully with reference to the accompanying drawings.

The present disclosure relates to a new capacitive deionization (CDI) system and method for cyclic adsorption/desorption based electrochemical desalination. The system and method of the present disclosure recognizes that CDI performance metrics can vary widely with operating methods, and further that conventional CDI operating methods such as constant current (CC) and constant voltage (CV) show advantages in either energy or salt removal performance, but not both. The present CDI system and method addresses these challenges through the implementation of a sinusoidal forcing voltage (or a sinusoidal current). The system and method of the present disclosure uses a dynamic system modeling approach, and quantifies the frequency response (amplitude and phase) of CDI effluent concentration. Using a wide range of operating conditions, the present disclosure demonstrates that CDI can be modeled as a linear time invariant system. This model is validated with experiments and shows that a sinusoid voltage operation can simultaneously achieve high salt removal and strong energy performance, thus making it superior to other conventional operating methods. Based on the underlying coupled phenomena of electrical charge (and ionic) transfer with bulk advection in CDI, the present disclosure validates, by presenting experimental data, results and effectiveness of using sinusoidal voltage forcing functions to achieve resonance-type operation for CDI. Despite the complexities of the present system, an important relation for the resonant time scale is set forth: the resonant time period (frequency) is proportional (inversely proportional) to the geometric mean of the flow residence time and the electrical (RC) charging time. Operation at resonance implies the optimal balance between absolute amount of salt removed (in moles) and dilution (depending on the feed volume processed), thus resulting in the maximum average concentration reduction for the desalinated water.

The present disclosure further develops the above model to generalize the resonant time-scale operation, and to provide responses for square and triangular voltage waveforms as two specific examples. To this end, the present disclosure also presents a general tool that uses Fourier analysis to construct CDI effluent dynamics for arbitrary input waveforms. Using this tool, it can be shown that most of the salt removal (~95%) for square and triangular voltage forcing waveforms is achieved by the fundamental Fourier (sinusoidal) mode. The frequency of higher Fourier modes precludes high flow efficiency for these modes, so these modes consume additional energy for minimal additional salt removed. This deficiency of higher frequency modes further highlights the advantage of DC-offset sinusoidal forcing for the presently disclosed system and method of CDI operation.

2. A Resonant CDI Operation

Figure 1:
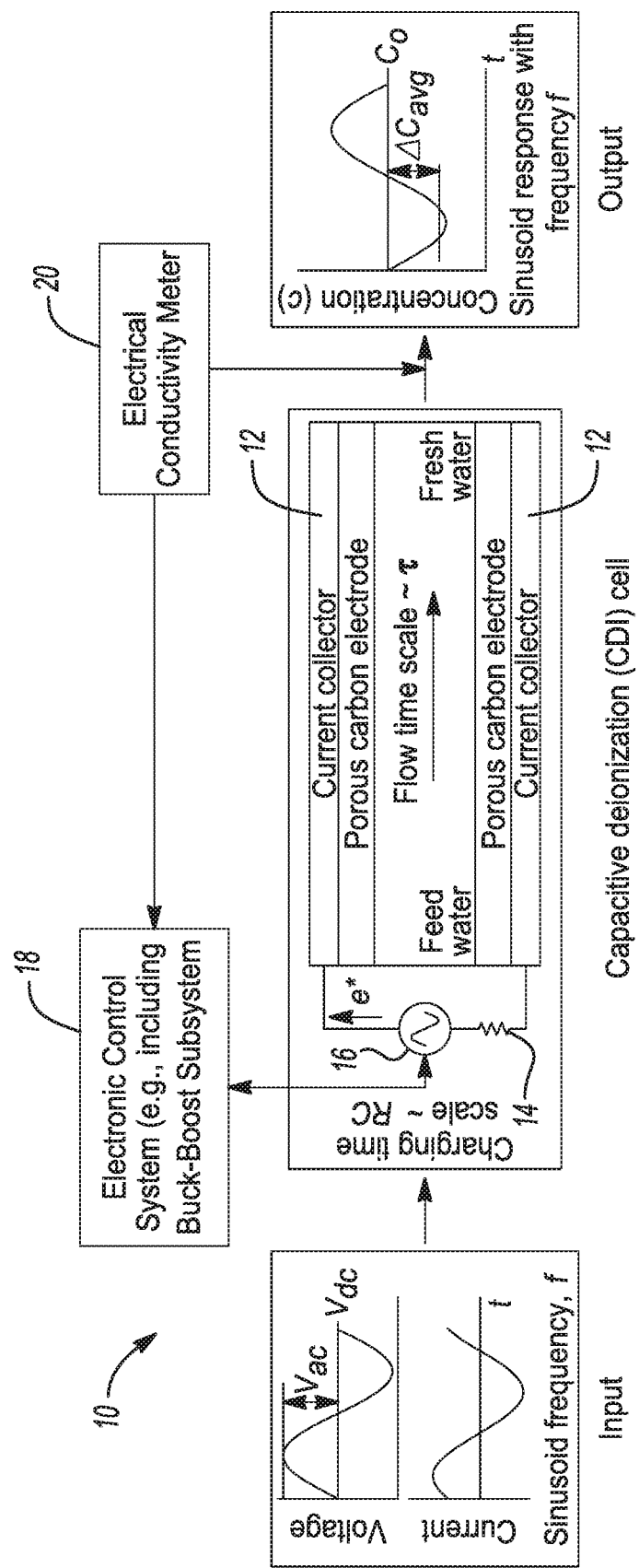

The present disclosure is focused around CDI desalination dynamics and the use of a sinusoidal forcing current or voltage. For simplicity and without significant loss of applicability, the electrical response of the CDI cell is treated as a simple, series, linear RC circuit with effective R and C values, as determined in the following section Section 3.2. A highly simplified example of such a CDI cell 10 is shown in FIG. 1. A pair of porous carbon electrodes form collector plates 12 which are spaced apart to form a flowpath, and which form a capacitor, through which feed water flows during the desalination operation. The capacitance of the capacitor formed by plates 12, and a resistance of a resistor 14, determine the RC time constant for the CDI cell 10. A forcing signal source 16, which in this example may produce a sinusoidally varying voltage or current, provides the electrical input forcing signal for the cell 10. An electronic control system 18 may optionally be used to provide adjustments to the output of the forcing signal source 16 to account for drift and other small scale variables. Optionally, an electrical conductivity meter 20 may be included for measuring an electrical conductivity of effluent concentration and providing a signal representative of same back to the electronic control system 18. Based on the signal from the electrical conductivity meter 20, the electronic controller 18 may optionally apply further adjustments to the forcing signal source 16 to tune operation of the CDI system cell 10. The input forcing signal of the CDI cell 10 results in a desalination response in terms of an effluent concentration versus time, for the feed water flowing between the plates 12. Again for simplicity, the coupling between electrical input and concentration of the output stream can be described using a simple continuous stirred-tank reactor (CSTR) model (Biesheuvel et al. "*Dynamic adsorption/Desorption Process Model for Capacitive Deionization,*" The Journal of Physical Chemistry C 113.14 (2009), 5636-5640. https://doi.org/10.1021/jp809644s; Hawks et al. "*Quantifying the Flow Efficiency in Constant-Current Capacitive Deionization,*" Water Research 129 (2018), 327-336. https://doi.org/10.1016/j.watres.2017.11.025; Jande and Kim. "*Desalination Using Capacitive Deionization At Constant Current,*" Desalination 329 (2013), 29-34. https://doi.org/10.1016/J.DESAL.2013.08.023; Ramachandran et al. "*Self Similarities in Desalination Dynamics and Performance Using Capacitive Deionization,*" Water Research 140 (2018), 323-334. https://doi.org/10.106/j.watres.2018.04.042).

For the CDI cell 10 electrical circuit, we assume a DC-offset sinusoidal forcing voltage given by $$V(t)=V_{dc}+\Delta V \sin(\omega t), \quad (1)$$

where $V_{dc}$ is the constant DC component of applied voltage (typically >0 V for good performance), $\Delta V$ is the amplitude of the sinusoid voltage, and $\omega$ is the forcing frequency. Under dynamic steady state (DSS) such that the initial condition has sufficiently decayed as per the CDI system's natural response, current I in the electrical circuit may be expressed as:

$$I(t) = \frac{C\Delta V_\omega}{\sqrt{1+(\omega RC)^2}} \cos(\omega t - \arctan(\omega RC)) = \quad (2)$$

$$\frac{C\Delta V_\omega}{\sqrt{1+(\omega RC)^2}} \sin\left(\omega t + \frac{\pi}{2} - \arctan(\omega RC)\right).$$

The result of Equation (2) can be represented as $$I(t)=\Delta I \sin(\omega t + \phi_{IV}) \quad (3)$$

where the amplitude, and the phase of current with respect to voltage, are given by $$\Delta I = \frac{C\Delta V_\omega}{\sqrt{1+(\omega RC)^2}}, \text{ and } \phi_{IV} = \frac{\pi}{2} - \arctan(\omega RC),$$

respectively.

Further, the dynamics that govern effluent concentration reduction $\Delta c$ via the mixed reactor model approximation can be described as, $$\tau \frac{d(\Delta c)}{dt} + \Delta c = \frac{I(t)\overline{\lambda}}{FQ} \quad (4)$$

where $\Delta c = c_0 - c(t)$ represents an appropriate reduction of the feed concentration $c_0$ at the effluent, Q is flow rate, F is Faraday's constant, $\tau(=\forall/Q)$ is the flow residence time scale ($\forall$ is the mixed reactor volume), and $\overline{\lambda}(=\lambda_{dl},\lambda_c)$ is an effective dynamic charge efficiency ($\lambda_c$ and $\lambda_{dl}$) are respectively the cycle averaged Coulombic and EDL charge efficiencies). Using Equation (3) in (4), and solving for effluent concentration reduction under DSS, we obtain $$\Delta c(t) = \quad (5)$$

$$\frac{C\Delta V\omega\overline{\lambda}}{FQ\sqrt{1+(\omega\tau)^2}\sqrt{1+(\omega RC)^2}} \sin\left(\omega t + \frac{\pi}{2} - \arctan\left(\frac{\omega(RC+\tau)}{1-\omega^2\tau RC}\right)\right).$$

Equivalently, $$\Delta c(t) = \Delta c_{ac} \sin(\omega t + \phi_{cV}) \quad (6)$$

where $$\Delta c_{ac} = \frac{C\Delta V\overline{\lambda}\omega}{FQ\sqrt{1+(\omega\tau)^2}\sqrt{1+(\omega RC)^2}}$$

is the maximum change in effluent concentration, and $$\phi_{cV} = \frac{\pi}{2} - \arctan\left(\frac{\omega(RC+\tau)}{1-\omega^2\tau RC}\right)$$

is the phase of $\Delta c$ with respect to V. Further, the phase of $\Delta c$ with respect to current I is given by $\phi_{cI} = -\arctan(\omega\tau)$. Also, the average concentration reduction at the effluent is given by $\Delta c_{avg} = 2\Delta c_{ac}/\pi$, and water recovery is 50%. Note the absolute concentration difference $\Delta c_{ac}$ depends on extensive (versus mass-specific, intensive) CDI cell properties such as R, C, and cell volume. Importantly, $\Delta c_{ac}$ is also a function of operational parameters such as Q, voltage window, and forcing frequency $\omega$. We find that the basic coupling of RC circuit dynamics and mixed reactor flow directly results in what we here will refer to as a "resonant frequency", $\omega_{res}$. This frequency maximizes effluent concentration reduction $\Delta c_{ac}$ in Equation (6) and is simply the inverse geometric mean of the respective circuit and flow time scales, $$\omega_{res} = \frac{1}{\sqrt{\tau RC}}. \quad (7)$$

Furthermore, the maximum average concentration reduction $\Delta c_{avg,res}$ achieved at the resonant frequency may be given by, $$\Delta c_{avg,res} = \Delta c_{avg}|_{\omega=\omega_{res}} = \frac{2C\Delta V\overline{\lambda}}{\pi F \forall} \frac{1}{1+(RC/\tau)} = \frac{\overline{\lambda}}{\pi F \forall} \frac{\Delta V}{R}\left(\frac{2\tau RC}{\tau+RC}\right). \quad (8)$$

With reference to FIG. 1, the rationale behind the term "resonant" may be explained as follows. CDI as a periodic dynamic process involves the coupling of several physical phenomena including (i) electrical charging/discharging (governed by the RC time scale of the CDI system), with (ii) salt removal at the electrodes and freshwater recovered at the outlet by fluid flow (governed by the flow residence time scale $\tau$). Each of these two time scales affects salt removal, and each is physically independent of the other. The CDI system's average concentration reduction, as indicated in the "Output" graph of FIG. 1, is $\Delta c_{avg} = \langle \Delta c(t) \rangle$ (where the brackets indicate a time average over the desalination phase), therefore couples the two time scales in a manner very similar to resonance in a dynamic system. Hence, we refer to the periodic CDI operation at the fundamental frequency $\omega_{res}$ (independent of the forcing function waveform) as a "resonant operation".

Lastly, it will be noted that the dynamic system analysis presented in this section can also be derived using a Laplace transform formulation involving transfer functions for the CDI system. For readers who may find this more intuitive or familiar, we provide such a formulation in Section S1 below. Somewhat surprisingly, the present work is the first to develop such transfer function formulation for practical operations using CDI.

3.1 CDI Cell Design

The present disclosure further involved fabricating and assembling a flow between (fbCDI) cell using the radial-flow architecture described in Biesheuvel and van der Wal. "*Membrane Capacitive Deionization,*" J. Memb. Sci. 346, (2010) 256-262. https://doi.org/10/1016/J.MEMSCI.2009.09.043, Hemmatifar et al. "*Energy Break-down in Capacitive Deionization,*" Water Research 104, (2016) 303-311. https://doi.org/10.1016/J.WATRES.2016.08.020, and Ramachandran et al. "*Self Similarities in Desalination Dynamics and Performance Using Capacitive Deionization,*" Water Research 140 (2018), 323-334. https://doi.org/10.1016/j.watres.2018.04.042. Five pairs of activated carbon electrodes (with 5 cm diameter, 300 μm thickness, and total dry mass of 2.65 g were stacked between 5 cm diameter, 130 μm thick titanium sheets which acted as current collectors. Two 180 μm thick non-conductive polypropylene circular meshes (McMaster-Carr, Los Angeles, Calif.) were stacked between each electrode pair as spacers, with an estimated porosity of ~59%. The spacers had a slightly larger (~5 mm) diameter than the electrodes and current collectors to prevent electrical short circuits.

3.2 Experimental Methods and Extraction of Model Parameters

An experimental setup consisted of the fbCDI cell, a 3 L reservoir filled with 20 mM potassium chloride (KCl) solution which was circulated in a closed loop, a peristaltic pump, a flow-through conductivity sensor close to the cell outlet, and a sourcemeter. We estimate less than 1% change in reservoir concentration based on adsorption capacity of our cell, and thus approximate influent concentration as constant.

The resistance and capacitance of the cell were characterized using simple galvanostatic charging, and these estimates were corroborated by electrochemical impedance spectroscopy (EIS) and cyclic voltammetry measurements using a potentiostat/galvanostat (e.g., such as available from Gamry Instruments, Warminster, Pa.). See SI Section S2 for data. We estimated a differential cell capacitance of 33±1.8 F (equivalently ~44 F/cm$^3$ and 49 F/g) and an effective series resistance of 2.85±0.28 Ohms, resulting in a system RC time scale of ~94 s. To determine the mixed reactor cell volume $\forall$, we used an exponential fit to the temporal response (open-circuit flush) of the cell as described in Hawks et al., 2018a and Ramachandran et al., 2018, and we estimated V of 2.1±0.2 ml. For simplicity, all of the forced (sinusoidal, triangular and square voltage) responses presented in this work are at a constant flowrate of 2.3 ml/min, corresponding to a residence time scale $\tau$ ($=\forall/Q$) of ~55 sec. Thus, the operational and system parameters described here result in a resonant frequency $f_{res}$ ($=\omega_{res}/2\pi$) value of 2.2 mHz (using Equation (7)), and a corresponding resonant time scale $T_{res}$ ($=1/f_{res}$) of 450 sec. The water recovery was 51-57% for all the cases presented here.

4.0 Results and Discussion 4.1 Cdi as a First Order Linear Time Invariant (Lti) Dynamic Process—Response to Sinusoid Voltage Forcing The desalination dynamics associated with CDI from a "dynamical system modeling" viewpoint were also studied. To this end, we subjected the CDI cell with a constant flow rate and operated with a sinusoidal voltage forcing. Further, we constrained the voltage of operation within reasonable limits: sufficiently low peak voltage such that the Coulombic losses were small, and a voltage window such that EDL charge efficiency could be approximated by a constant value (Hawks et al. "*Quantifying the Flow Efficiency in Constant-Current Capacitive Deionization,*" Water Research 129 (2018), 327-336. https://doi.org/10.1016/j.watres.2017.11.025; Kim et al. "*Enhanced Charge Efficiency and Reduced Energy Use in Capacitive Deionization by Increasing the Discharge Voltage,*" Journal of Colloid Interface Science 446 (2015), 317-326. https://doi.org/10.1016/J.JCIS.2014.08.041; Ramachandran et al. "*Self Similarities in Desalination Dynamics and Performance Using Capaci-* tive Deionization," Water Research 140 (2018), 323-334. https://doi.org/10.1016/j.watres. 2018.04.042).

Figure 2:
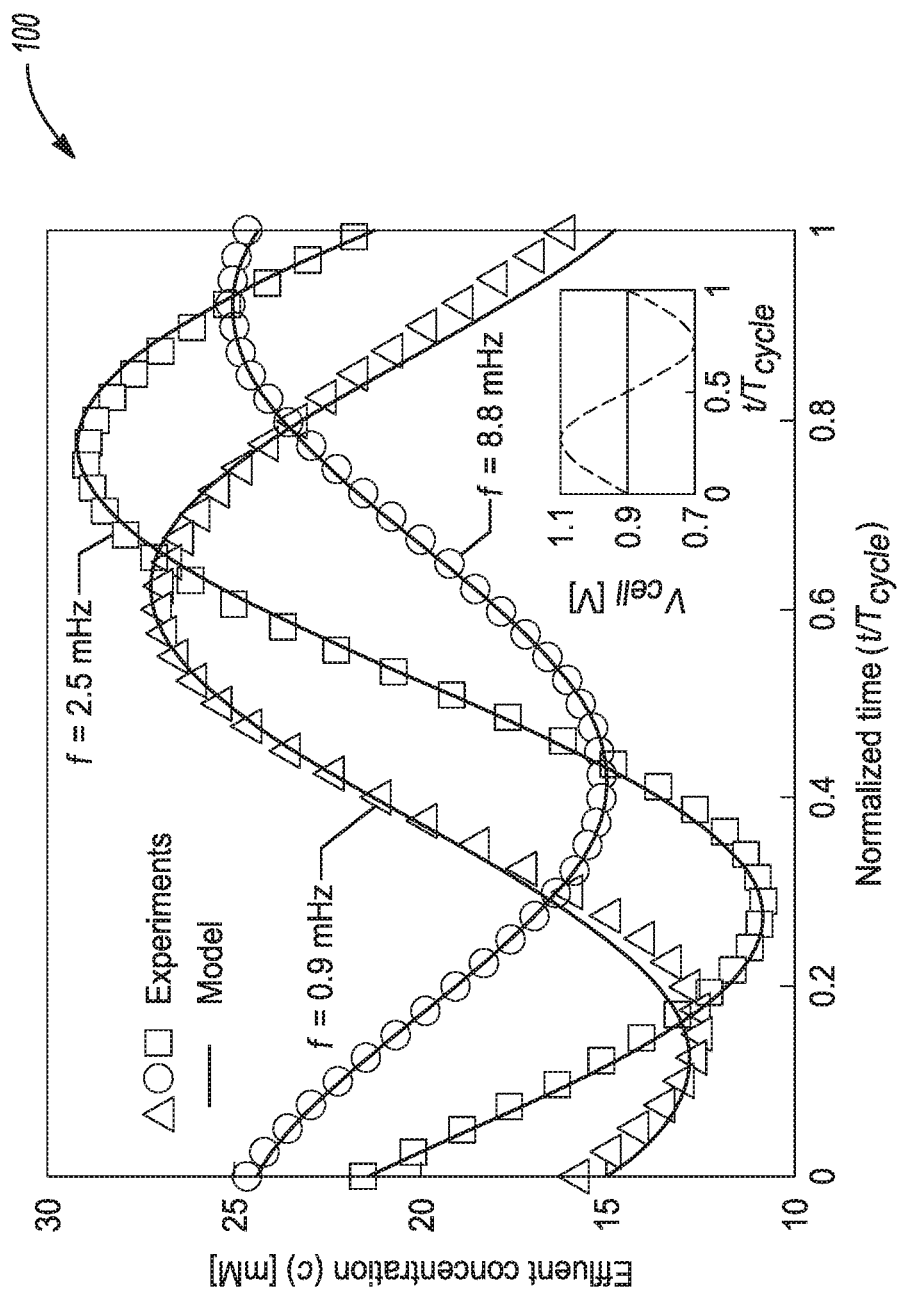

FIG. 2 shows a plot 100 of experimental data along with a corresponding prediction by the model (i.e., the model CDI system of Section 2 above). Plotted is the effluent concentration c versus time for a sinusoidal voltage operation with a voltage window of 0.7 to 1.1 V, and a constant flowrate of 2.3 ml/min. Results are shown for three different frequencies approximately spanning a decade (0.9, 2.5, and 8.8 mHz). For experimental data, a time delay of ~4 s was subtracted from the measured time, which is associated with the temporal delay associated with transport and dispersion between cell concentration and the downstream conductivity meter. For the CDI system model, we used a constant value of EDL charge efficiency of 0.91 (determined using data shown for the same voltage window in FIG. 3), and used an experimentally determined (average) value of Coulombic efficiency of 0.94 (a value we found to be nearly constant for the all frequencies shown in FIG. 2). Using the sinusoidal voltage forcing (shown in inset of FIG. 2), we observed that the measured effluent concentration also varies, to very good approximation, as a sinusoidal in time. Further, this CDI model predicts experimental observations (both amplitude and phase of c) very well over the range of frequencies presented in FIG. 2. The observation that a sinusoidal forcing function (here, voltage or current) to a dynamical system (here, the CDI cell) results in a nearly sinusoidal response (here, the effluent concentration) is, of course, a characteristic of an approximately linear time invariant (LTI) system. By definition, an LTI system is both linear and time-invariant, i.e., the output is linearly related to the input, and the output for a particular input does not change depending on when the input was applied.

We thus infer that the desalination dynamics using CDI can be modeled to a good approximation as a first order linear time invariant (LTI) system under the following conditions: (i) constant flowrate (with advection dominated transport), (ii) small variation in dynamic EDL charge efficiency such that it can be approximated by a constant value, and (iii) high Coulombic efficiency (close to unity). LTI systems have well-developed tools for system analysis and control, and thus can be applied to analyzing CDI systems. In Section S3 below, we provide one anecdotal "off-design" sinusoidal input operation of CDI which results in significant distortion of the output concentration. Namely, we show the case of a large variation in EDL charge efficiency due to a large voltage window wherein effluent concentration exhibits a significant deviation from a sine wave. Further study of such deviations from linearity may be helpful in gaining a further understanding of variations in EDL charge efficiency.

Importantly, the predictions and experimental data of FIG. 2 show that the effluent concentration has a frequency-dependent amplitude and a distinct phase shift with respect to the forcing voltage waveform—an observation which is studied further in the following Section 4.2.

Lastly, it should be noted that, although the focus herein is on sinusoidal voltage forcing functions, our work with the present CDI model indicates that sinusoidal current may also be used to characterize CDI dynamics. It is expected that sinusoidal applied current can also yield sinusoidal time variation of effluent concentration, thus extending the utility of the teachings presented herein. Preliminary experiments have been performed toward such a study and during such work it was observed that sinusoidal forcing currents easily lead to deviations from ideal behavior (and the model) due to unwanted Faradaic (parasitic) reactions. This results in an attenuation of concentration reduction in regions of high voltage, and a more complex natural response relaxation from the initial condition. Such sinusoidal forcing also preferably requires non-zero DC values for applied current to account for unavoidable Faradaic losses. Accordingly, it will be understood that a sinusoidal voltage will virtually always be preferred over sinusoidal current forcing as a more controllable and practical operating method.

4.2 Frequency Response: Bode Plot and Resonant Frequency Analysis for CDI

Figure 3A:
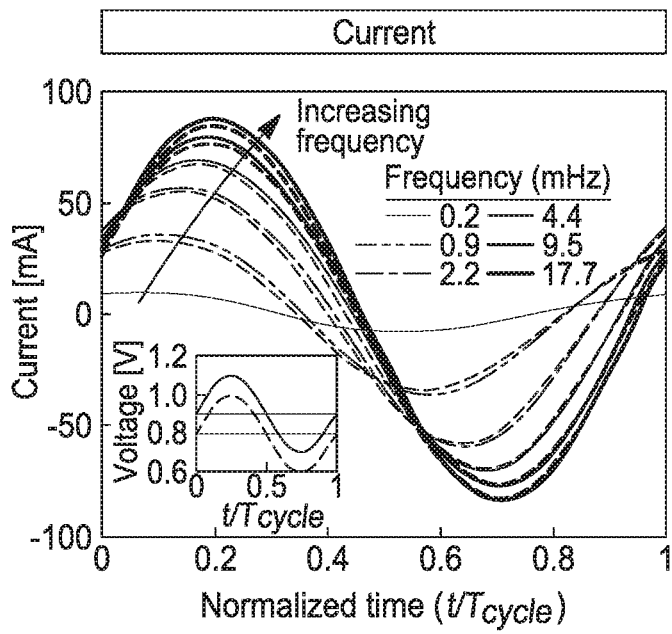
Figure 3C:
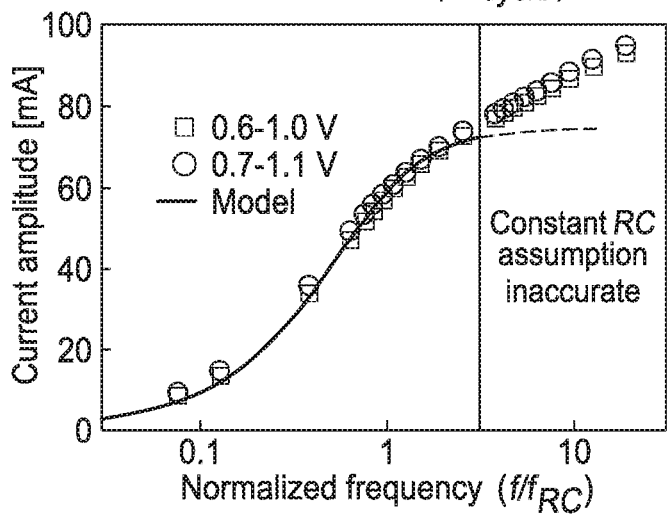
Figure 3E:
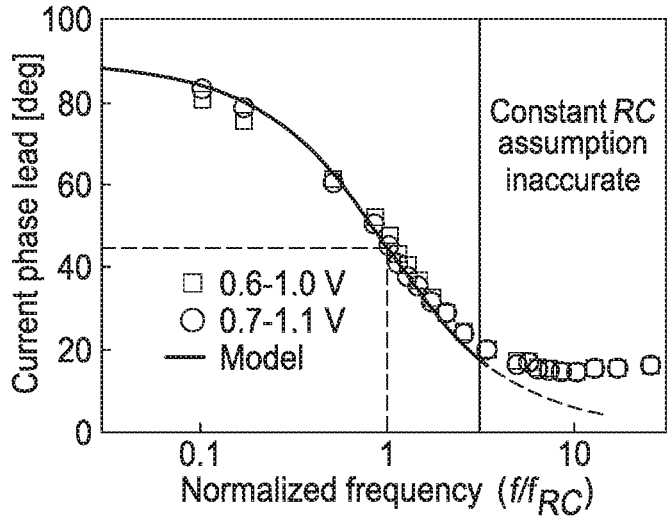
Figure 3B:
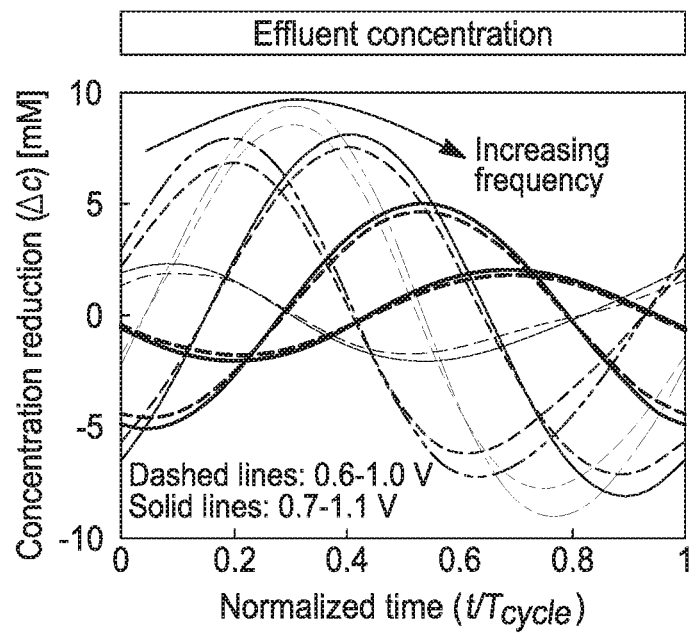
Figure 3D:
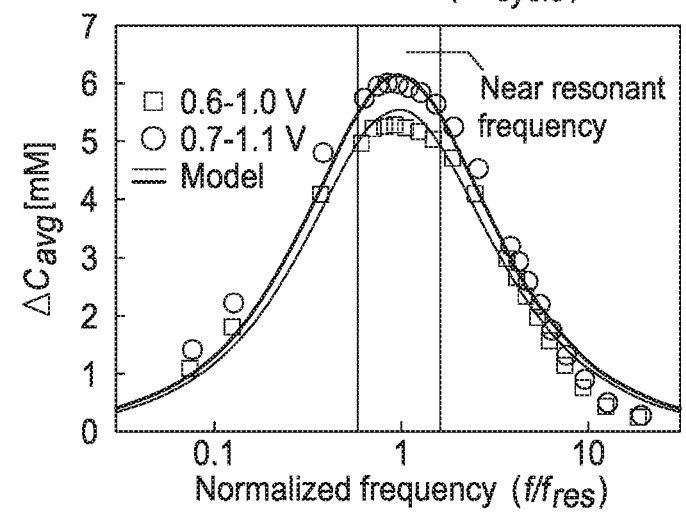
Figure 3F:
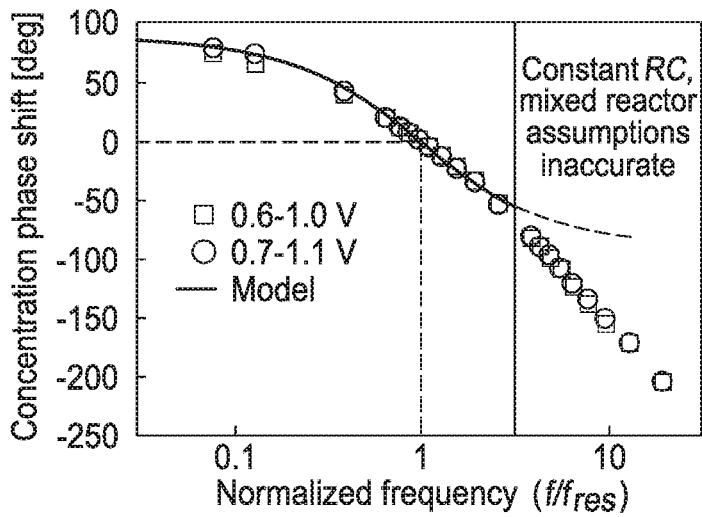

In this section, we present a frequency analysis of the response of current and effluent concentration in CDI for a forcing sinusoidal voltage. FIGS. 3a and 3b show measured current and effluent concentration profiles versus time (normalized by cycle duration) for a sinusoidal voltage forcing with frequencies spanning 0.2 to 17.7 mHz. Shown in FIGS. 3a and 3b are results for two voltage windows (see inset of FIG. 3a) with the same $\Delta V$ of 0.2 V, but with $V_{dc}$ values of 0.8 V (dashed lines) and 0.9 V (solid lines). FIGS. 3c and 3e respectively show the frequency dependence of the amplitude and phase of the current response (i.e., Bode plots for current). FIGS. 3d and 3f show the corresponding frequency dependence of average concentration reduction and phase shift in effluent concentration (Bode plots for $\Delta c$). Note that for data in FIGS. 3c and 3e, the governing RC time scale (for current response) was chosen for normalizing the frequency, and for effluent concentration data in FIGS. 3d and 3f, the resonant time scale (which governs $\Delta c$) was chosen to normalize frequency.

4.2.1 Current Response

From FIG. 3a, it will be noted that the current response for a sinusoidal forcing voltage to the CDI cell is also sinusoidal (to a good approximation) over a wide range of frequencies. We quantify the amplitude and phase lead of the current response from experiments versus the forcing frequency (normalized by the RC frequency) in FIGS. 3c and 3e respectively. For calculating amplitude, we average the two peak values of current (corresponding to charging and discharging) after subtracting the DC value (corresponding to leakage current at $V_{dc}$). For calculating phase shift of current with respect to forcing voltage from data, we averaged the two phase shifts estimated using the time delay (normalized by cycle time) between the peak values of the sinusoidal current and voltage. We further overlay results from the model in FIGS. 3c and 3e.

It will be noted in FIG. 3e that current always leads the forcing voltage in time (i.e., $\phi_{IV}>0$), as expected for an RC-type electrical circuit. In other words, the peak in current response occurs before the corresponding peak value of forcing voltage. Further, the phase lead of current with respect to voltage decreases with increasing frequency (e.g., note the shift in the sinusoidal current profile to the right in FIG. 3a). At $f=f_{RC}=(RC)^{-1}$, the phase lead of current is ~45 degrees. Note also from FIGS. 3a, 3c and 3e that operationally, the current profile (amplitude and phase shift) is less sensitive to the DC voltage ($V_{dc}$) value, since it mainly depends on $\Delta V$, and system parameters R and C (from Equation (3)). Also, note the high level of agreement of the model predictions for both amplitude and phase of current, especially for the most practically relevant, moderate-to-low frequency range of operation. It is believed that the deviation of the model predictions from experiments at high frequencies ($f \gtrsim 3f_{RC}$) is due to a deviation from a constant RC, linear assumption. At these relatively high frequencies, the CDI cell electrical response exhibits a transient response better modeled using more complex circuits such as the transmission line response associated with non-linear distributed EDL capacitances (De Levie "*On Porous Electrodes in Electrolyte Solutions*," Electrochimica Acta 8.10, 751-780. https://doi.org/10.1016/0013-4686(63) 80042-0; Qu et al. "*Energy Consumption Analysis of Constant Voltage and Constant Current Operations in Capacitive Deionization*," Desalination 400 (2016), 18-24. https://doi.org/10.1016/j.desal.2016.09.014; Suss et al. "*Capacitive Desalination With Flow-Through Electrodes*," Energy & Environmental Science 5.11 (2012), 9511-9519. https://doi.org/10.1039/c2ee21498a).

4.2.2 Effluent Concentration Response

We here follow an averaging procedure similar to that of Section 4.2.1 to evaluate the phase and amplitude of the effluent response. For the effluent response, the only fitting parameter for the model is the product $\overline{\lambda}$ ($=\lambda_{dl}\lambda_c$), and we determine this product from the aforementioned best fit curve approach to extract cycle-averaged Coulombic and double layer efficiencies from the experimental data (see SI Section S4 for further details). We obtained values of $\overline{\lambda}$ of 0.8 (corresponding to $\lambda_{dl}$ of 0.91 and $\lambda_c$ of 0.88) and 0.73 (corresponding to $\lambda_{dl}$ of 0.82 and $\lambda_c$ of 0.92) for $V_{dc}$ of 0.8 V and 0.9 V, respectively. Unlike the monotonic variations of phase and amplitude observed for current response in FIGS. 3c and 3e, effluent concentration exhibits a distinctly non-monotonic variation in amplitude with changing frequency. From FIGS. 3b and 3d, we observe that as frequency increases, the amplitude of effluent concentration variation (and the average concentration reduction) increases, reaches a maximum, and then decreases. Further, unlike current, the effluent concentration profile both leads ($\phi_{cV}>0$) and lags ($\phi_{cV}<0$) the forcing voltage at low and high frequencies, respectively, as shown in FIG. 3f. The "special" frequency that corresponds to both (i) maximum amplitude, and (ii) the change in sign of the phase of effluent concentration with respect to the forcing voltage, is the resonant frequency $f_{res}$. At this resonant frequency, the effluent concentration is exactly in phase with the forcing sinusoid voltage function.

Operation at the resonant frequency results in the maximum desalination depth $\Delta c_{avg}$ for a given voltage window. This is clearly supported by experiments and model results shown in FIG. 3d. Also, note that $\Delta c_{avg}$ drops by ~50% for a frequency that is a factor of 5 away from the resonant frequency. Unlike current, the effect of voltage $V_{dc}$ (for the same $\Delta V$) on the amplitude of $\Delta c$ is significant, as shown in FIGS. 3b and 3d. Specifically, for the same $\Delta V$, a higher $V_{dc}$ (within the Faradaic dominant voltage limit of ~1.2 V, such that Coulombic efficiency is close to unity) results in a higher EDL efficiency (and thus cycle averaged charge efficiency). This yields higher $\Delta c_{avg}$ as per Equation (5). Conversely, the phase shift in effluent concentration is relatively insensitive to $V_{dc}$ (FIG. 3f). As with the current response data, the obtained effluent amplitude and phase measurements deviate from the model at higher frequencies ($f \geq 0.3 f_{res}$). It is believed that this is primarily due to the inaccuracy of the mixed flow reactor formulation (for cycle times significantly lower than the flow residence time).

4.2.3 Physical Significance of the Resonant Frequency and Operation: Limiting Regimes CDI as a practical dynamic process most often involves two dominant and independent time scales: (i) an RC time (electronic time scale associated with electrical circuit properties of the CDI system), and (ii) flow residence time (ionic transport time scale in a mixed reactor volume). The interplay between these two time scales determines the desalination depth $\Delta c_{avg}$ at the effluent. To better understand this interplay, we here describe operating scenarios corresponding to very high and very low operating frequencies.

At high frequency operation ($f \gg f_\tau$ and $f_{RC}$) the rapid forcing results in repeated desalination and regeneration (salt uptake and rejection) from and to approximately the same volume of water contained in the CDI cell. Further, the RC-type electrical response of the cell is such that high frequencies incompletely charge the capacitive elements of the cell. This wasteful operation consumes energy and leads to low $\Delta c_{avg}$. For very low frequencies ($f \ll f_\tau$ and $f_{RC}$) or equivalently long cycle durations, the EDLs are fully charged (high EDL charge efficiency) and freshwater recovery at the effluent is high (flow efficiency close to unity; c.f. Section 4.3.2); each of which is favorable. However, in this limiting regime, the system can be characterized as suffering from the mitigating effect of "overly dilute" effluent. That is, after EDL charging, the majority of the charging phase is spent flushing feed water through (and out of) the cell. Similarly, after EDL discharge, the majority of the discharging phase is again spent flowing feed water. Both of these phases hence exhibit a low value of the inherently time-averaged magnitude of $\Delta c_{avg}$.

A corollary to the discussion above is that, for a given CDI cell and flowrate, there exist two frequencies ($f_{low,\Delta c}$ and $f_{high,\Delta c}$) for which $\Delta c_{avg}$ in a cycle is the same (see FIG. 3d, for example). $f_{high,\Delta c}$ results in less than optimal $\Delta c_{avg}$ because part of the water desalinated in the charging was "re-salinated" prior to efficient extraction of the liquid in the cell (i.e., poor flow efficiency). $f_{low,\Delta c}$ operation efficiently extracts processed water from the cell, but then overly dilutes the effluent fresh water (brine) with feedwater during charging (discharging). Hence, we can interpret operation at the resonant frequency $f_{res}$ (when $f_{low,\Delta c}=f_{high,\Delta c}$) as the optimal tradeoff (to achieve maximum $\Delta c_{avg}$) between these two effects—an operation implying a good balance between properly extracting desalted water versus overly diluting the effluent with feed water.

4.3 Energy Consumption and Charge Efficiency Depend Strongly on Operating Frequency 4.3.1 Energy Consumption The frequency dependence of the volumetric energy consumption $E_v$ (assuming 100% electrical energy recovery during discharge) may be defined as $$E_v \ [\text{kWh/m}^3] = \frac{\int_{t_{cycle}} IV dt}{\int_{t_{cycle}|\Delta c>0} Q dt}. \tag{9}$$

Figure 4A:
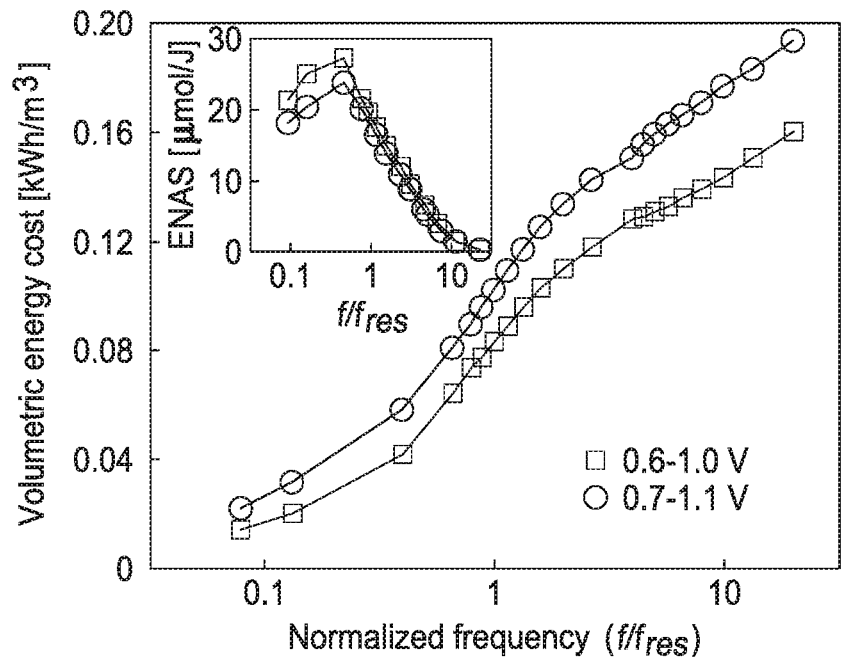
FIG. 4b shows graphs of cycle charge efficiency as a function of input sinusoidal voltage frequency for voltage windows of 0.6 to 1.0 V and 0.7 to 1.1 V, and with the inset figure showing the variation of flow efficiency versus input frequency normalized by $f_{res}$.

FIG. 4a shows the experimental volumetric energy consumption $E_v$ for a sinusoidal voltage operation versus frequency of operation for voltage windows of 0.6 to 1.0 V ($V_{dc}=0.8$ V and $\Delta V=0.2$ V) and 0.7 to 1.1 V ($V_{dc}=0.9$ V and $\Delta V=0.2$ V). $E_v$ monotonically decreases as frequency decreases. For a fixed $\Delta V$, a lower $V_{dc}$ (compare data for $V_{dc}=0.8$ V and 0.9 V in FIG. 4a) results in smaller $E_v$, but this comes at a price of lower $\Delta c_{avg}$ (see FIG. 3d). Note that $E_v$ is very sensitive to even a single decade change in frequency. For example, for $V_{dc}=0.8$ V and $\Delta V=0.2$ V, at $f/f_{res}$ of 0.1, $E_v$ is 0.015 kWh/m$^3$ and at $f/f_{res}$ of 10, $E_v$ is 0.15 kWh/m$^3$. Clearly, a careful choice of operating frequency and voltage window is important to ensure good trade-off between energy consumption and desalination depth.

These analyses show that the fundamental frequency of the input forcing function $f$ should be within a factor of 10 of $f_{res}$. Here, "fundamental" frequency is the frequency at which the periodic signal repeats itself. That is, that the non-dimensional frequency $f/f_{res}$ should vary within about 0.1 to 10. Ideally, and for best performance, the fundamental frequency of the input forcing function $f$ should be within a factor of 5 of $f_{res}$ (i.e. values of $f/f_{res}$ within 0.2 to 5). Further, to account for salt removal in addition to the corresponding energy consumption, the inset graph of FIG. 4a shows the energy normalized adsorbed salt (ENAS) defined as $$ENAS \; [\mu mol/J] = \frac{\int_{t_{cycle}|\Delta c>0} Q \Delta c dt}{\int_{t_{cycle}} IV dt}. \tag{10}$$

ENAS is a measure of salt removed (in moles) per energy consumed (in Joules) per cycle. As frequency decreases, ENAS increases, reaches a maximum and then decreases. Importantly, note that the maximum ENAS occurs at a frequency close to (slightly less than) the resonant frequency $f_{res}$, thus again highlighting the importance of operation near the resonant frequency for good overall CDI performance. We attribute the decrease in ENAS at low frequencies to Faradaic energy losses which can become a significant source of energy loss for long cycles.

Lastly, we note that our estimate for the volumetric energy consumption $E_v$ in Equation (9) and FIG. 4 assumed 100% energy recovery during electrical discharge. In SI Section S6, we show the corresponding volumetric energy consumption values assuming 0% recovery of electrical energy. With 0% energy recovery, we observe the same trends for both $E_v$ and ENAS with frequency and voltage window, as compared with 100% energy recovery.

4.3.2 Charge Efficiency

The frequency dependence of the conversion of electrical input charge to ions removed, as calculated from the effluent stream, was also studied. This conversion may be quantified by defining the cycle charge efficiency as $$\Lambda_{cycle} = F \frac{\int_{t_{cycle}|\Delta c>0} Q \Delta c dt}{\int_{t_{cycle}|I>0} I dt}. \tag{11}$$

Previous studies have shown that the cycle charge efficiency $\Lambda_{cycle}$ can be expressed as a product of three efficiencies as $\Lambda_{cycle} = \lambda_{dl} \lambda_c \lambda_{fl} = \overline{\Lambda} \lambda_{fl}$. Here, $\lambda_{fl}$ is the flow efficiency which depends on number of cell volumes flowed during charging and discharging.

Figure 4B:
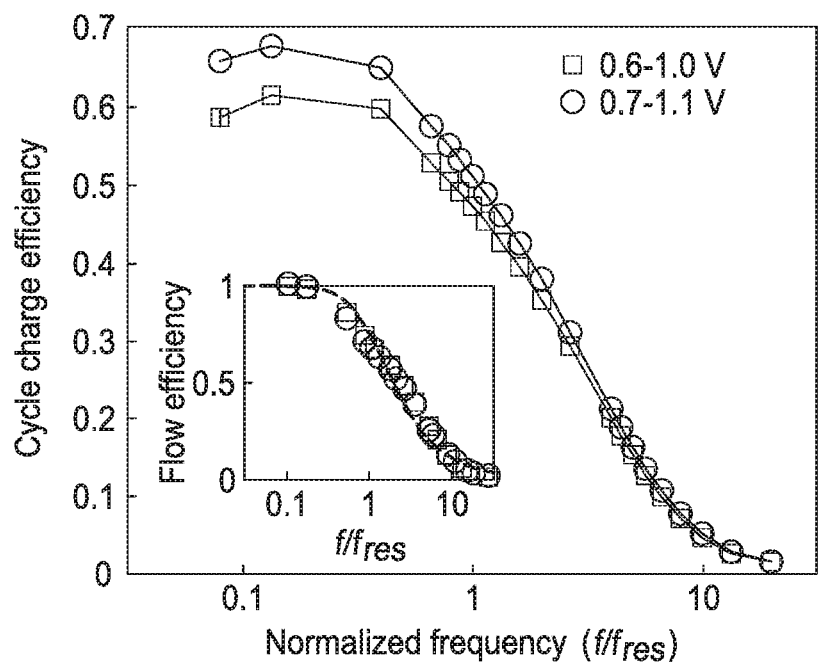

FIG. 4b shows calculated cycle charge efficiency $\Lambda_{cycle}$ values for the same conditions as in FIG. 4a. As frequency decreases, cycle charge efficiency initially increases, reaches a plateau, and then decreases slightly at very low frequency. Also, a larger $V_{dc}$ (and fixed $\Delta V$) results in a higher cycle charge efficiency. It is believed that these trends are primarily a result of the frequency dependence of flow efficiency $\lambda_{fl}$, and only a weak function of $\lambda_{dl}$ or $\lambda_c$. Consider that, for finite duration charging cycles at a given flow rate (e.g., $f/f_{res} \sim 0.5$ or less in FIG. 4b), the calculated Coulombic efficiency $\lambda_c$ is high and nearly constant. For example, we estimated a Coulombic efficiency of 0.92 and 0.88 for $V_{dc}$ of 0.8 V and 0.9 V respectively (see the following Section S4 for detailed description of trends in $\lambda_c$. Further consider that, for a fixed voltage window, the EDL efficiency $\lambda_{dl}$ is approximately constant (Ramachandran et al., 2018). For example, from the data of FIG. 3d, we estimate $\lambda_{dl}$ to be 0.8 and 0.91 for $V_{dc}$ of 0.8 V and 0.9 V respectively.

To support our hypothesis, we developed the following analytical expression for flow efficiency $\lambda_{fl}$ for a sinusoid voltage operation:

$$\lambda_{fl} = \frac{1}{\sqrt{1+(\omega \tau)^2}} \tag{12}$$

The associated derivation is given in the following Section S1. We compared the predicted flow efficiency versus frequency based on Equation (12) with the corresponding extracted values for flow efficiency values from experimental data ($\lambda_{fl} = \Lambda_{cycle}/\overline{\Lambda} = \Lambda_{cycle}/(\lambda_{dl} \lambda_c)$; see inset of FIG. 4b). Note first from the inset of FIG. 4b that the extracted flow efficiency values from experiments (for both $V_{dc}$ cases) all collapse onto the same curve. Further, our derived flow efficiency expression (Equation (12)) for sinusoidal voltage operation (dashed line in the inset of FIG. 4b) accurately captures the observed variation in data. This agreement is consistent with an accurate estimate of the mixed reactor cell volume (which is used to evaluate residence time $\tau$ in Equation (12)).

4.4 Generalization of Resonant Frequency Operation for Other Conventional Operations (Square and Triangular Voltage Waveforms)

We here generalize the resonant frequency operation for other conventional forcing waveforms such as square voltage (typically referred to as constant voltage operation in CDI) and triangular voltage (an operation similar to constant current operation). We operated the CDI cell with square and triangular voltage waveforms at varying cycle frequencies between 0.7 to 1.1 V (see inset of FIG. 5a) and at a constant flowrate of 2.3 ml/min. We used this data to study the variation of performance metrics with applied frequency and waveform shape (see the following Section S5 for current and effluent concentration responses versus time). We then compare the performance of these two voltage waveforms with the sinusoidal voltage waveform at equivalent operating conditions. FIGS. 5a, 5b, and the inset of 5b, show the frequency dependent variation of average concentration reduction $\Delta c_{avg}$, volumetric energy consumption $E_v$, and ENAS, respectively, for square, triangular, and sinusoidal voltage forcing functions to the CDI cell. For both ENAS and $E_v$, we here assume 100% energy recovery during discharge. Reference may be made to Section S6 below for data corresponding to no energy recovery. As discussed earlier, the upper bound of the voltage window in CDI operation is typically used to avoid significant Faradaic reaction losses, while the lower bound can be used to maintain sufficiently high EDL efficiency. Hence, we here chose to impose the same voltage window (0.7 to 1.1 V) to all three waveforms.

The data of FIG. 5a shows that the square, triangular, and sinusoidal voltage forcing waveforms result in the same general trend for $\Delta c_{avg}$ as a function of frequency. As frequency increases, $\Delta c_{avg}$ initially increases, reaches a maximum, and then decreases at high frequency. All three operating waveforms result in peak values of $\Delta c_{avg}$ near the resonant frequency (indicated by the band of frequencies near $f/f_{res} \approx 1$ in FIG. 5a), highlighting the importance of operation near the resonant time scale.

Of the three waveforms considered here, the square voltage waveform (CV) results in the highest $\Delta c_{avg}$, followed by sinusoidal (less than square wave by ~15%), and then triangular (less than square wave by ~43%) voltage waveforms. However, the volumetric energy consumption $E_v$ for the triangular voltage wave operation is the lowest, followed by sinusoidal (around 1.5× of the triangular waveform $E_v$), and then square (around 4× of the triangular waveform $E_v$) voltage waveforms (see FIG. 5b). The inset of FIG. 5b shows measured ENAS values (a measure of salt removal per energy consumed) for the three waveforms. ENAS values are nearly the same for the triangular and sinusoidal, and their ENAS values are roughly 2× better than that of the square waveform near the resonant operation. We further show in SI Section below that for 0% energy recovery during discharge and near resonant operation, ENAS values are highest for sinusoidal waveform, followed by triangular (around 90% of sinusoidal waveform ENAS) and square (around 80% of sinusoidal waveform ENAS) voltage waveforms, respectively.

Together, the data of FIG. 5 and the earlier analysis of sinusoidal operation suggest two important aspects of operational frequency and waveform. First, operation near the resonant time scale (frequency) for these three voltage waveforms yields near optimal values of $\Delta c_{avg}$. Second, the sinusoidal waveform achieves high ENAS (comparable to the triangle voltage waveform), as well as $\Delta c_{avg}$ values much higher than the triangular waveform. Although the present disclosure considers only these three waveforms, it may be hypothesized that these insights span a wide range of both voltage and current forcing function waveforms in CDI. In the next section, we further support this hypothesis using a Fourier mode decomposition of the forcing waveforms.

4.5 Constructing Effluent Response for Arbitrary Forcing Functions

This section summarizes a Fourier analysis which is helpful in rationalizing the various merits of CDI control schemes. Without loss of generality, we will assume that periodic forcing of the CDI cell is controlled by voltage, although a similar approach can be developed for a current forcing. Equation (5) in Section 2 is the expression for the effluent response for a sinusoidal forcing voltage with frequency $\omega$ ($=2\pi f=2\pi/T$). Any arbitrary voltage forcing V(t) which is periodic with time period T (and phase of zero at t=0) can be decomposed into its Fourier series as $$V(t) = \frac{a_0}{2} + \sum_{n=1}^{\infty} [a_n \cos(n\omega t) + b_n \sin(n\omega t)] \quad (13)$$

with Fourier coefficients $a_n$ and $b_n$ given by $$a_n = \frac{2}{T} \int_0^T V(t)\cos(n\omega t)dt \text{ for } n = 0, 1, 2, \ldots, \quad (14)$$

and $$b_n = \frac{2}{T} \int_0^T V(t)\sin(n\omega t)dt \text{ for } n = 1, 2, \ldots. \quad (15)$$

Each of the term in the summation in Equation (13) corresponds to a Fourier mode. As shown in Sections 2 and 4.1, CDI can be modeled accurately as a linear time invariant system (under appropriate operating conditions), thus obeying linear superposition of effluent responses due to multiple forcing functions. We thus here hypothesize that the generalized forced response for an arbitrary forcing function in Equation (13) can be obtained using linear superimposition of responses of its Fourier components (modes). Section 2 presented the frequency response of CDI for a single sine wave and we can now interpret that response as the response of any one of an arbitrary number of Fourier modes.

We here analyze two special cases of Equations (13)-(15) corresponding to square and triangular voltage forcing waveforms (as shown in the inset of FIG. 5a). The well-known Fourier modal decompositions for the square ($V_{sq}(t)$) and triangular ($V_{tri}(t)$) voltage waveforms are given by $$V_{sq}(t) = V_{dc} + \frac{4\Delta V}{\pi} \sum_{n=1}^{\infty} \frac{\sin((2n-1)\omega t)}{2n-1} \quad (16)$$

and, $$V_{tri}(t) = V_{dc} + \frac{8\Delta V}{\pi^2} \sum_{n=1}^{\infty} \frac{(-1)^{(n-1)}\sin((2n-1)\omega t)}{(2n-1)^2}. \quad (17)$$

Note that for the triangular wave Fourier modes in Equation (17), the amplitudes of harmonics decay as $1/(2n-1)^2$, compared to the $1/(2n-1)$ decay for the square waveform (Equation (16)).

FIG. 6 shows the measured effluent concentration response for the square (FIGS. 6(a)-(c)) and triangular (FIGS. 6(d)-(f)) voltage forcing for flowrate of 2.3 ml/min and an operating frequency spanning 0.43 to 4.3 mHz. In addition, we overlay the effluent response obtained by linearly superimposing the effluent response due to the first two and ten non-zero Fourier modes (excluding the DC component, i.e., up to n=2, and n=10, respectively) in Equations (16) and (17). For fair comparison with experiments, we used cycle averaged EDL ($\lambda_{dl}$=0.91) and Coulombic efficiencies ($\lambda_c$=0.91 for cases (a), (b), (e) and (f), and $\lambda_c$=0.8 for (c) and (f)), as per the experimental data (as discussed in Section 4.3).

From FIG. 6, we observe that the first two Fourier modes are sufficient to capture the effluent dynamics to a very good approximation for both the square and triangular voltage waveforms and over a practically relevant operating frequency range spanning over a decade. From Equations 16 and 17, these two Fourier modes are the fundamental sine wave Fourier mode (n=1) and the first harmonic (n=2). Our analysis suggests strongly that the higher harmonics do not contribute significantly to salt removal. In fact, as we will show in FIG. 7, inclusion of higher harmonics can sometimes lower $\Delta c_{avg}$ compared to just the fundamental, sinusoidal mode. Briefly, the higher Fourier modes suffer from the drawback of operation at higher fundamental frequency (see also Section 4.2.3). Namely, higher modes attempt to force the cell to operate faster than both the RC circuit can respond and faster than water can be recovered from within the cell. Hence, they have inherently inferior flow efficiency and disproportionally consume energy. We therefore find that the first sine wave Fourier mode (n=1) contains a significant fraction of the total power of the input function and also achieves majority of the concentration reduction. The higher modes (n≥2) primarily contribute to achieve the observed shape of effluent concentration and electrical response corresponding to the input forcing.

FIG. 7 shows predicted concentration reduction $\Delta c_{avg}$ and energy consumption (estimated here as resistive energy loss in a cycle) versus the number of Fourier modes involved in the summation for the square and triangular waveforms (in Equations (16) and (17), respectively). From FIGS. 7a and 7b, $\Delta c_{avg}$ does not change significantly beyond the inclusion of the first two to five Fourier modes. This is also apparent in the time variation plots of the effluent concentration presented in the insets of FIGS. 7a and 7b. Addition of a second (or higher) Fourier mode can result in either increased $\Delta c_{avg}$ (for e.g., see the triangular voltage case in FIG. 7a) or lower $\Delta c_{avg}$ (for e.g., see the square voltage case in FIG. 7b) compared to the first mode alone depending on the operating frequency. However, the addition of a second (and higher) Fourier mode(s) in the forcing function always results in increased energy consumption. For example, for the square wave, inclusion of all the modes (here, up to n=20) results in a ~65% increase in energy consumption over the fundamental mode alone. The amplitude of the modes of the triangular waveform decay faster, as $1/(2n-1)^2$, and so their effect on overall energy consumed is less pronounced. For example, including all modes (here, up to n=20) increases energy by only ~5% relative to the fundamental.

These observations lead us to conclude the shape of the input forcing function should be close to the fundamental sine wave (n=1) and that this periodic wave should be added to a time-averaged DC component. To this end, we here define the "amplitude" of any periodic signal to be the maximum absolute value difference between the value of the periodic signal and the time-averaged value (during one cycle) of the periodic signal. Given the aforementioned increase in energy associated with higher harmonics, we estimate that the ratio of the amplitude of the highest magnitude sinusoidal mode (n≥1) of the Fourier series of the input signal to the amplitude of the input signal should be between 0.85 and 1.25. Ideally, the ratio of the amplitude of the highest magnitude sinusoidal mode of a Fourier series representation of the input signal to the amplitude of the input signal should be between 0.9 and 1.1.

For both the square and triangular waves, approximately 95% of the $\Delta c_{avg}$ is achieved by the fundamental (sinusoidal) Fourier mode alone. Adding higher frequency modes therefore provides only a slight increase (or sometimes even a decrease) in salt removal as compared to the fundamental mode alone, but at the great cost of significant energy consumption. This analysis leads us to the hypothesis that, for constant flow and appropriately voltage thresholded operation of CDI, the sinusoidal voltage operation introduced here is likely a near ideal tradeoff between salt removal performance and energy consumption.

SUMMARY AND CONCLUSIONS

The present disclosure thus teaches a model based on a dynamic system approach for a CDI system. The analysis set forth herein considers the coupled effects of electrical circuit response and the salt transport dynamics of a CDI cell. The teachings presented herein show that CDI cells with properly designed voltage windows exhibit first-order and near-linear dynamical system response. Experiments were performed to validate the model, and both theory and the experiments were used to study CDI performance for a variety of operational regimes. For the first time, the present disclosure identifies an inherent resonant operating frequency for CDI equal to the inverse geometric mean of the RC and flow time scales of the cell. The present disclosure also quantifies the frequency-dependent amplitude and phase of the current and effluent concentration responses for a sinusoidal voltage forcing. The teachings presented herein show that CDI operation near resonant frequency enables maximum desalination depth $\Delta c_{avg}$.

The present disclosure further demonstrates that resonant frequency operation can be generalized to other operation methods, and presented analysis of square and triangular voltage forcing waveforms as two relevant case studies. Based on our validated theory, we developed a generalized tool that utilizes Fourier analysis for constructing effluent response for arbitrary input forcing current/voltage waveforms for predicting CDI effluent response. The present disclosure strongly suggests that a sinusoidal forcing voltage for CDI is the ideal operational mode to balance the tradeoff of energy consumption and salt removal in constant flow operation.

S.1 Supplemental Theory for Sinusoidal Voltage/Current Forcing for CKI

The following provides further details around the theory for predicting desalination dynamics associated with a sinusoidal voltage with a direct current (DC) offset as a forcing for capacitive deionization (CDI) as presented in Section 2 above. We assume that the electrical response of CDI can be described to a good approximation by a linear series resistor-capacitor (RC) circuit 200 such as shown in FIG. 8. FIG. 8 represents one example of the model coupling electrical and fluid flow physics in a CDI system. The linear series RC circuit 200 governs ion electrosorption via charge transfer while a well-mixed reactor volume 202 affects the efficiency of recovery of processed water recovery at the effluent via bulk advection.

To describe salt removal and freshwater recovery at the effluent, we assume a continuously stirred tank model. We present our derivation below of the coupled dynamics in two parts. First, we solve for the RC circuit current response for a sinusoidal voltage forcing. Second, we solve for dynamics associated with the effluent concentration reduction using the solution from the previous step, and assuming a well-mixed reactor.

S1.1 RC Circuit Analysis

Assume a series RC circuit with a DC-offset sinusoidal forcing voltage given by $$V(t) = V_{dc} + \Delta V \sin(\omega t), \quad (18)$$

where $V_{dc}$ is the constant DC component of applied voltage, $\Delta V$ is the amplitude of the sinusoid voltage and $\omega$ is the forcing frequency. Denoting the capacitive voltage drop by $V_c$, Kirchhoff's voltage law applied to the circuit in FIG. 8 results in $$RC\frac{dV_c}{dt} + V_c = V(t) = V_{dc} + \Delta V \sin(\omega t). \quad (19)$$

Equation (19) can be written as, $$RC\frac{d\tilde{V}_c}{dt} + \tilde{V}_c = \Delta V \sin(\omega t) \quad (20)$$

where $\tilde{V}_c = V_c - V_{dc}$. For long-duration dynamic steady state operation such that the transient associated with natural response (due to non-zero initial conditions) has decayed, the solution to Equation (20) is described the particular solution. The particular solution to Equation (20) is, $$\tilde{V}_c(t) = \frac{\Delta V}{\sqrt{1+(\omega RC)^2}} \sin(\omega t - \arctan(\omega RC)) \quad (21)$$

Since the current given by $$I = C\frac{dV_c}{dt}, \quad (22)$$

we obtain the current in the circuit from Equation (21) as $$I(t) = \frac{C\Delta V\omega}{\sqrt{1+(\omega RC)^2}} \cos(\omega t - \arctan(\omega RC)) = \quad (23)$$

$$\frac{C\Delta V\omega}{\sqrt{1+(\omega RC)^2}} \sin\left(\omega t + \frac{\pi}{2}\arctan(\omega RC)\right)$$

The result in equation (23) can be expressed as $$I(t)=\Delta I \sin(\omega t+\phi_{IV}), \quad (24)$$

where the current amplitude $$\Delta I = \frac{C\Delta V\omega}{\sqrt{1+(\omega RC)^2}}$$

and the phase of current with respect to voltage is given by $$\phi_{IV} = \frac{\pi}{2} - \arctan(\omega RC).$$

S1.2 Mixed Reactor Model

We use a continuously stirred tank reactor model for predicting the effluent concentration dynamics. In a mixed reactor model, the salt removal dynamics is given by $$\tau\frac{d(\Delta c)}{dt} + \Delta c = \frac{I(t)\overline{\Lambda}}{FQ} \quad (25)$$

where $\tau$ is the flow residence time, and we have assumed constant dynamic charge efficiency, $\overline{\Lambda}$.

Combining Equation (24) in (25), we derive $$\tau\frac{d(\Delta c)}{dt} + \Delta c = \frac{\Delta I\overline{\Lambda}}{FQ} \sin(\omega t + \phi_{IV}). \quad (26)$$

The solution to Equation (26) is $$\Delta c(t) = \quad (27)$$

$$\frac{C\Delta V\bar{\omega}\overline{\Lambda}}{FQ\sqrt{1+(\omega\tau)^2}\sqrt{1+(\omega RC)^2}} \sin\left(\omega t + \frac{\pi}{2} - \arctan(\omega RC) - \arctan(\omega\tau)\right)$$

which can be simplified as $$\Delta c(t) = \quad (28)$$

$$\frac{C\Delta V\overline{\Lambda}\omega}{FQ\sqrt{1+(\omega\tau)^2}\sqrt{1+(\omega RC)^2}} \sin\left(\omega t + \frac{\pi}{2} - \arctan\left(\frac{\omega(RC+\tau)}{1-\omega^2\tau RC}\right)\right)$$

Equivalently, $$\Delta c=\Delta c_{ac} \sin(\omega t+\phi_{cV}), \quad (29)$$

where $$\Delta c_{ac} = \frac{C\Delta V\overline{\Lambda}\omega}{FQ\sqrt{1+(\omega\tau)^2}\sqrt{1+(\omega RC)^2}}$$

is the maximum change in effluent concentration, and the phase of $\Delta c$ with respect to the forcing voltage V is given by $$\phi_{cV} = \frac{\pi}{2} - \arctan(\omega t) - \arctan(\omega RC) = \frac{\pi}{2} - \arctan\left(\frac{\omega(RC+\tau)}{1-\omega^2\tau RC}\right).$$

The phase of $\Delta c$ with respect to current is given by $\phi_{cI}=\phi_{cV}-\phi_{IV}=-\arctan(\omega\tau)$.

Note further that $\Delta c_{ac}$ and $\Delta I$ are related by, $$\Delta c_{ac} = \frac{\Delta I\overline{\Lambda}}{FQ}\frac{1}{\sqrt{1+(\omega\tau)^2}}. \quad (30)$$

S1.3 Flow Efficiency for Sinusoidal Forcing

The number of moles of salt $\Delta N$ removed per cycle is given by $$\Delta N = \int_{t|\Delta c>0} Q\Delta c dt = \int_{t|\Delta c>0} Q\Delta c_{ac}\sin(\omega t + \phi_{cV})dt = \frac{2}{\omega}Q\Delta c_{ac}. \quad (31)$$

In addition, the charge transferred $\Delta q$ to the CDI cell per cycle is given by $$\Delta q = \int_{t|I>0} I dt = \int_{t|\Delta c>0} \Delta I\sin(\omega t + \phi_{IV})dt = \frac{2}{\omega}\Delta I. \quad (32)$$

The cycle charge efficiency $\Lambda_{cycle}$ (measure of moles of salt removed as calculated at the effluent to the electrical charge input in moles) is related to the flow efficiency $\lambda_{fl}$ (measure of fresh water recovery at the effluent) through the following relation, $$\Lambda_{cycle} = \overline{\Lambda}\lambda_{fl} = F\frac{\Delta N}{\Delta q} = \frac{FQ\Delta c_{ac}}{\Delta I}, \quad (33)$$

where Equations (31) and (32) have been used for the last equality in Equation (33). Substituting Equation (30) in (33), we thus obtain the expression for flow efficiency for the sinusoidal operation as $$\lambda_{fl} = \frac{1}{\sqrt{1 + (\omega \tau)^2}}. \quad (34)$$

S1.4 Transfer Functions for CDI

In this section transfer functions are developed relating the output (effluent concentration reduction) to input (current or voltage) for dynamic steady state CDI operation, under appropriate conditions as mentioned in Section 4.1 above.

Applying a Laplace transform to Equation (19), the transfer function relating the capacitive voltage $V_c$ to the applied voltage V is derived as, $$\frac{V_c(s)}{V(s)} = \frac{1}{(sRC + 1)} \quad (35)$$

where s is the Laplace variable (Laplace frequency domain).

Further, from Equation (22) we have $$I(s) = sCV_c(s). \quad (36)$$

Using Equation (36) in (35), we obtain the transfer function relating the current in the CDI circuit and applied voltage as $$\frac{I(s)}{V(s)} = \frac{sC}{(RCs + 1)}. \quad (37)$$

Next, from the mixed reaction model (Equation 25), the transfer function relating the effluent concentration reduction to current can be obtained as $$\frac{\Delta c(s)}{I(s)} = \frac{\overline{\Lambda}}{FQ(\tau s + 1)}. \quad (38)$$

Combining Equations (38) and (37), we obtain the following transfer function relating the effluent concentration reduction and the applied voltage:

$$\frac{\Delta c(s)}{V(s)} = \frac{C\overline{\Lambda}}{FQ} \frac{s}{(\tau s + 1)(RCs + 1)}. \quad (39)$$

Equations (37)-(39) are the transfer functions that relate the input (current or voltage) to the output (effluent concentration reduction) for a linear time invariant CDI system.

S2. Cell Resistance and Capacitance Measurements

A series of preliminary experiments were performed to characterize the CDI cell resistance and capacitance. First, we used simple galvanostatic charging and discharging (see FIG. 9) to estimate resistance and capacitance using the following expressions:

$$C_{eq} = \frac{I}{(dV/dt)}, \text{ and}, \quad (40)$$

$$R_{eq} = \frac{|\Delta V|_{I \to -I}}{2I}, \quad (41)$$

where $|\Delta V|_{I \to -I}$ is the voltage drop when current reverses sign (with the same magnitude). For the cases presented in FIGS. 9a and 9b, using Equations (40) and (41), we estimated a resistance of 2.8±0.3 Ohm, and a capacitance of 33.6±1.7 F.

To corroborate the cell resistance estimate, we performed electrochemical impedance spectroscopy (EIS) of the entire assembled cell with 20 mM KCl solution and at flow rate of 2.3 ml/min. For EIS measurements (see FIG. 10a), we applied a sinusoidal voltage perturbation with amplitude of 10 mV and scanned over a frequency range from 1 MHz to 10 mHz with 0 V DC bias. Using EIS, we estimate an effective resistance of $R_\infty \approx 2.8$ Ohm.

To verify the cell capacitance estimate, we performed cyclic voltammetry for the entire cell. For cyclic voltammetry, we used a scan rate of 0.2 mV/s, flow rate of 2.3 ml/min, and 20 mM KCl solution, and performed measurements till a steady state was reached. In FIG. 10b, we show the CV measurement for the fifth cycle (under steady state conditions). Using cyclic voltammetry, we estimate an effective cell capacitance of $C_{eq} \approx 33$ F.

S3. Example of an Off-Design Sinusoidal Operation

To illustrate an operation wherein the effluent concentration variation with time is not sinusoidal for a DC-offset sinusoidal voltage forcing, we show in FIGS. 11a-11d a case where the CDI operating voltage varies between 0 to 1.2 V at a constant flowrate of 2.3 ml/min. For the results presented in FIGS. 11a-11d, we used a dynamic Gouy-Chapman-Stern (GCS) model which was solved numerically for the model. For the GCS model results shown in FIGS. 11a-11d, we used $c_{st}$=0.4 F/m², a=100 m², g=1 μm/s, R=1 Ohm, $c_0$=20 mM, A=100 cm², $\forall$=2.1 ml, $V_{PZC}$=0 V, and Q=2.3 ml/min, with no leakage currents. The operation considered here is a sinusoidal voltage forcing with $V_{dc}$=0.6 V and $\Delta V$=0.6 V. Note that in this off-design operation, EDL charge efficiency varies significantly during a cycle (between ~0 to 1), thus leading to a non-sinusoidal response for the effluent concentration (and current). This violates the constant EDL charge efficiency requirement for a sinusoidal response (see Section 4.1 above). Thus, the effluent concentration is non-sinusoidal with time (see FIG. 11a). A careful choice of the voltage window (in addition to other conditions as mentioned in Section 4.1) is thus essential to ensure a close-to sinusoidal variation of the effluent concentration with time.

S4. Coulombic Efficiency for Sinusoidal Operation

In this section we present the Coulombic efficiency data for sinusoidal voltage operation between 0.6 to 1.0 V, and 0.7 to 1.1 V, as a supplement to the data presented in FIG. 4. Coulombic efficiency $\lambda_c$ is defined as ratio of the recovered electronic charge $q_{out}$ to the input charge transferred $q_{in}$, given by $$\lambda_c = \frac{q_{out}}{q_{in}} = \frac{\int_{t|I<0} I dt}{\int_{t|I>0} I dt} \quad (42)$$

FIGS. 11a-11d show the Coulombic efficiency versus the forcing sinusoidal voltage frequency for the same operating conditions as presented in FIGS. 3 and 4. Note that the Coulombic efficiency is relatively constant for moderate to high frequencies (here, greater than around 1 mHz), and drops significantly for very low frequencies. Based on the data in FIG. 12, we estimated effective Coulombic efficiency values of 0.88 and 0.92 for 0.7-1.1V and 0.6-1.0 V cases, respectively. The drop in Coulombic efficiency at very low frequencies can be attributed to the increased time spent at high voltages during low frequency operations, thus resulting in significant Faradaic charge transfer losses. Also note that the Coulombic efficiency values are lower (i.e., more Coulombic losses) at higher cell voltages.

S5. Measured Effluent Concentration and Current Data for Square and Triangular Voltage Forcing Waveforms at Various Frequencies FIGS. 13a-13d show measured effluent concentration and current versus time for a triangular waveform forcing function (FIGS. 13a and 13b) and for a square waveform forcing function (FIGS. 13c and 13d) corresponding to data presented in FIG. 5. Here, data is shown for a few representative operating frequencies, and for voltage CDI operation between 0.7 to 1.1 V. The flow rate for all of these experiments was a constant value of 2.3 ml/min.

S6. Volumetric Energy Consumption and ENAS with No Energy Recovery During Discharge In this section a study is presented of the energy consumption metrics (volumetric energy consumption and energy normalized adsorbed salt ENAS) assuming 0% energy recovery during discharge. The volumetric energy consumption with 0% energy recovery $E_v$ and the corresponding energy normalized adsorbed salt (ENAS) are defined as $$E_v[\text{kWh/m}^3] = \frac{\int_{t_{cycle}|IV>0} IVdt}{\int_{t_{cycle}|\Delta c>0} Qdt}, \quad (43)$$

and $$ENAS[\mu mol/J] = \frac{\int_{t_{cycle}|\Delta c>0} Q\Delta c dt}{\int_{t_{cycle}|IV>0} IVdt} \quad (44)$$

FIG. 14 shows the variation of $E_v$ with 0% energy recovery as a function of input sinusoidal voltage frequency for voltage windows of 0.6 to 1.0 V and 0.7 to 1.1 V. $E_v$ decreases with decreasing frequency, whereas ENAS increases, reaches a plateau, and then slightly decreases with decreasing frequency. Further, the 0.6 to 1.0 V voltage window case has lower $E_v$ and higher ENAS values when compared to the 0.7 to 1.1 V case. Note that these trends for $E_v$ are similar to that as observed for volumetric energy consumption $E_v$ and ENAS with 100% energy recovery as presented in Section 4.3.1 above. The Inset graph of FIG. 14 shows the corresponding variation of energy normalized adsorbed salt (ENAS) versus input voltage frequency normalized by $f_{res}$.

In FIG. 15, we compare experimental measurements of energy metrics (ENAS and volumetric energy consumption) assuming no energy recovery as a function of operating frequency for three different waveforms: square, triangular, and sinusoidal voltages operated between 0.7 to 1.1 V. We observe from FIG. 14 that the volumetric energy consumption with no energy recovery is highest for the square waveform, followed by the sinusoidal, and triangular voltage waveforms respectively. This result is similar to that as seen with 100% energy recovery in Section 4.4 above.

Furthermore, the experimental data of the inset graph of FIG. 15 shows that the ENAS values with no energy recovery for frequencies near and lower than the resonant frequency are highest for the sinusoidal waveform, followed by the triangular (less than sinusoidal waveform ENAS by 10%) and then square (less than sinusoidal waveform ENAS by 20%) voltage waveforms, respectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A capacitive deionization (CDI) system for desalinating salt water, the system comprising:
   a capacitor formed by a first electrode and a second electrode spaced apart from the first electrode, which enables a fluid flow containing salt water to pass at least one of between the first and second electrodes, or through the first and second electrodes;
   an input electrical power source;
   the input electrical power source configured to generate an electrical forcing signal between the first and second electrodes;
   the electrical forcing signal representing a periodic signal including at least one of voltage or current;
   wherein the periodic signal can be represented as a Fourier series;
   wherein one component of the Fourier series is a constant;
   wherein a second component of the Fourier series is a sinusoidal wave component of non-zero frequency which has the highest amplitude of additive components of the Fourier series; and
   wherein an amplitude of said sinusoidal wave component is between 0.85 and 1.25 times an amplitude of the periodic signal.

2. The system of claim 1 wherein the amplitude of said sinusoidal wave component is between 0.9 and 1.2 times the amplitude of the forcing periodic signal.

3. The system of claim 1, further comprising an electronic control system in communication with the input electrical power source for controlling the input electrical power source.

4. The system of claim 3, further comprising an electrical conductivity meter for measuring an electrical conductivity of effluent concentration of the salt water, and providing a signal representative of same back to the electronic control system.

5. The system of claim 1, wherein the electrical forcing signal comprises a DC-offset sinusoidal forcing voltage represented by:

$$V(t) = V_{dc} + \Delta V \sin(\omega t) + V_c(t)$$

where $V_c(t)$ is a component whose RMS value is less than 0.5 of the RMS value of $V_{dc}$ and $\Delta V$.

6. The system of claim 1, wherein the frequency of the electrical forcing signal is a value determined by a characteristic flow residence time of fluid in a mixed reactor volume and a characteristic resistance and capacitance electrical response of the system.

7. The system of claim 1, wherein a cycling frequency of the electrical forcing signal is within a factor of 10 of the resonant frequency ($\omega_{res}$) of the system determined by $$\omega_{res} = \frac{1}{\sqrt{\tau RC}}$$

where R is a characteristic electrochemical resistance of the system, C is ionic capacitance of the system, and $\tau$ is a flow time scale defined by:

$$\tau = V/Q$$

where V is a fluid volume contained with a capacitive deionization (CDI) cell and Q is a time-averaged volume flow rate through the CDI cell.

8. The system of claim 7, wherein the cycling frequency of the electrical forcing signal is within a factor of 5 of the resonant frequency ($\omega_{res}$).

9. The system of claim 1, further comprising first and second current collectors coupled to the first and second electrodes, respectively, for receiving the electrical forcing signal; and
   wherein the first and second electrodes comprise porous carbon electrodes.

10. A capacitive deionization (CDI) system for desalinating salt water, the system comprising:
    a capacitor formed by a first electrode and a second electrode spaced apart from the first electrode, which enables a fluid flow containing salt water to pass at least one of between the first and second electrodes, or through the first and second electrodes;
    an input electrical power source;
    the input electrical power source configured to generate an input electrical forcing signal between the first and second electrodes;
    the input electrical forcing signal representing a periodic signal including at least one of voltage or current;
    the periodic signal having a fundamental frequency within a factor of 10 of a resonant frequency $\omega_{res}$ given, where $\omega_{res}$ is given by:

$$\omega_{res} = \frac{1}{\sqrt{\tau RC}}$$

wherein $\tau$ is a flow time scale given by $$\tau = V/Q$$

wherein V is a fluid volume contained with a capacitive deionization (CDI) cell and Q is a time-averaged volume flow rate through the CDI cell; and
    wherein RC is a product of a characteristic resistance R and capacitance C of an electrical response of the CDI cell.

11. The system of claim 10, wherein the periodic signal has a fundamental frequency within a factor of 5 of a resonant frequency $\omega_{res}$.

12. The system of claim 10, wherein the periodic signal has a fundamental frequency within a factor of 2 of a resonant frequency $\omega_{res}$.

13. The system of claim 10, further comprising first and second current collectors coupled to the first and second electrodes, respectively, for receiving the electrical forcing signal; and wherein the first and second electrodes comprise porous carbon electrodes.

14. A capacitive deionization (CDI) system for desalinating salt water, the system comprising:
a capacitor formed by a first electrode and a second electrode spaced apart from the first electrode, which enables a fluid flow containing salt water to pass at least one of between the first and second electrodes, or through the first and second electrodes;
an input electrical power source;
the input electrical power source configured to generate an electrical forcing signal between the first and second electrodes;
the electrical forcing signal representing a periodic signal including at least one of voltage or current;
wherein the periodic signal has a fundamental frequency within a factor of 10 of a resonant frequency $\omega_{res}$ given, where $\omega_{res}$ is given by:

$$\omega_{res} = \frac{1}{\sqrt{\tau RC}}$$

wherein $\tau$ is a flow time scale given by $$\tau = V/Q$$

wherein V is a fluid volume contained with a capacitive deionization (CDI) cell and Q is a time-averaged volume flow rate through the CDI cell;
wherein RC is a product of a characteristic resistance R and capacitance C of an electrical response of the CDI cell;
wherein the periodic signal has a Fourier series as additive sinusoidal components; and
wherein an amplitude of a sinusoidal wave of non-zero frequency with the highest amplitude of the additive components of the Fourier series is between 0.85 and 1.25 times an amplitude of the forcing periodic signal.

15. The system of claim 14, further comprising first and second current collectors coupled to the first and second electrodes, respectively, for receiving the electrical forcing signal; and wherein the first and second electrodes comprise porous carbon electrodes.

16. The system of claim 14, wherein the periodic signal has a fundamental frequency within a factor of 10 of a resonant frequency $\omega_{res}$ and wherein the highest amplitude of the additive components of the Fourier series is between 0.9 and 1.2 times the amplitude of the forcing periodic signal.

17. A method for desalinating salt water, the method comprising:
using a capacitor formed by a first electrode and a second electrode spaced apart from the first electrode, which enables a fluid flow containing salt water to pass at least one of between the first and second electrodes, or through the first and second electrodes;
using an input electrical power source to apply an electrical forcing signal between the electrodes;
controlling the electrical forcing signal to provide at least one of voltage or current as a periodic wave with a fundamental frequency plus a constant component; and
further controlling the electrical forcing signal so that a Fourier series representation of the periodic wave includes a non-zero frequency sinusoidal mode which has the highest amplitude of the additive components of the Fourier series with an amplitude between 0.85 and 1.25 times the amplitude of the forcing periodic signal.

18. The method of claim 17, further comprising controlling the electrical forcing signal so that the Fourier series representation of the periodic wave includes a sinusoidal wave with a finite frequency and which has an amplitude that is between 0.9 and 1.2 times the amplitude of the forcing periodic signal.

* * * * *